United States Patent
Seshadri et al.

(10) Patent No.: US 11,886,937 B2
(45) Date of Patent: *Jan. 30, 2024

(54) METHODS AND APPARATUS FOR DATA PIPELINES BETWEEN CLOUD COMPUTING PLATFORMS

(71) Applicant: VMWARE LLC, Palo Alto, CA (US)

(72) Inventors: Karthik Seshadri, Bangalore (IN); Rachil Chandran, Bangalore (IN); Shrisha Chandrashekar, Bangalore (IN); Tyler J. Curtis, Shingle Springs, CA (US); Aayush Asawa, Bangalore (IN); Radhakrishnan Devarajan, Bangalore (IN)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/824,827

(22) Filed: May 25, 2022

(65) Prior Publication Data

US 2022/0283881 A1 Sep. 8, 2022

Related U.S. Application Data

(63) Continuation of application No. 16/690,157, filed on Nov. 21, 2019, now Pat. No. 11,347,572.

(30) Foreign Application Priority Data

Sep. 26, 2019 (IN) .............................. 201941038899

(51) Int. Cl.
*G11C 16/04* (2006.01)
*G06F 9/54* (2006.01)
(Continued)

(52) U.S. Cl.
CPC .......... *G06F 9/544* (2013.01); *G06F 9/30079* (2013.01); *G06F 9/5072* (2013.01); *G06F 21/105* (2013.01); *H04L 67/10* (2013.01)

(58) Field of Classification Search
None
See application file for complete search history.

(56) References Cited

U.S. PATENT DOCUMENTS 6,047,323 A 4/2000 Krause
7,139,811 B2 11/2006 Lev Ran et al.
(Continued)

FOREIGN PATENT DOCUMENTS

WO 03103302 12/2003
WO 2009134755 11/2009
(Continued)

OTHER PUBLICATIONS

United States Patent and Trademark Office, "Notice of Allowance," dated Feb. 25, 2022 in connection with U.S. Appl. No. 16/690,157, 10 pages.

(Continued)

*Primary Examiner* — Pho M Luu
(74) *Attorney, Agent, or Firm* — Quarles & Brady LLP

(57) ABSTRACT

Methods, apparatus, systems and articles of manufacture to establish a data pipeline between cloud computing platforms. An apparatus includes at least one memory, machine readable instructions in the apparatus, and processor circuitry to execute the machine readable instructions to at least extract a data producer name from data, the data to be provided from a data producer to a data consumer, identify a buffer identifier based on a mapping of the data producer name to the buffer identifier, cause transmission of the data to a buffer associated with the buffer identifier, and cause transmission of the data from the buffer to the data consumer (Continued)

based on an association between the buffer identifier and a data consumer name, the data consumer name corresponding to the data consumer.

20 Claims, 13 Drawing Sheets

(51) Int. Cl.
| | |
|---|---|
| *G06F 9/30* | (2018.01) |
| *H04L 67/10* | (2022.01) |
| *G06F 21/10* | (2013.01) |
| *G06F 9/50* | (2006.01) |

(56) References Cited

U.S. PATENT DOCUMENTS

| | | | |
|---|---|---|---|
| 8,045,557 | B1 | 10/2011 | Sun et al. |
| 8,817,777 | B2 | 8/2014 | Manian et al. |
| 9,940,284 | B1 | 4/2018 | Davis et al. |
| 10,148,694 | B1 | 12/2018 | Sarin et al. |
| 10,417,281 | B2 | 9/2019 | Schechter et al. |
| 10,466,933 | B1 | 11/2019 | Bysani Venkata Naga et al. |
| 10,789,264 | B2 | 9/2020 | Crabtree et al. |
| 11,012,500 | B2 | 5/2021 | Dar et al. |
| 11,190,614 | B2 | 11/2021 | Dar et al. |
| 11,303,636 | B2 | 4/2022 | Back et al. |
| 11,347,572 | B2 * | 5/2022 | Seshadri ............ H04L 67/10 |
| 2002/0111811 | A1 | 8/2002 | Bares et al. |
| 2004/0177110 | A1 | 9/2004 | Rounthwaite et al. |
| 2006/0143459 | A1 | 6/2006 | Villaron et al. |
| 2008/0031230 | A1 | 2/2008 | Kacher et al. |
| 2008/0186962 | A1 | 8/2008 | Sinha |
| 2010/0250767 | A1 | 9/2010 | Barreto et al. |
| 2011/0060627 | A1 | 3/2011 | Piersol et al. |
| 2012/0036262 | A1 | 2/2012 | Murphy et al. |
| 2012/0131146 | A1 | 5/2012 | Choi et al. |
| 2012/0323990 | A1 | 12/2012 | Hayworth |
| 2013/0007183 | A1 | 1/2013 | Sorenson, III et al. |
| 2013/0039360 | A1 | 2/2013 | Manian et al. |
| 2013/0061046 | A1 | 3/2013 | Joy et al. |
| 2013/0198266 | A1 | 8/2013 | Kiley et al. |
| 2014/0079059 | A1 | 3/2014 | Amir et al. |
| 2015/0172183 | A1 | 6/2015 | DeCusatis et al. |
| 2015/0188949 | A1 | 7/2015 | Mahaffey et al. |
| 2015/0281181 | A1 | 10/2015 | Albisu |
| 2015/0319226 | A1 | 11/2015 | Mahmood |
| 2016/0088022 | A1 | 3/2016 | Handa et al. |
| 2016/0098037 | A1 | 4/2016 | Zornio et al. |
| 2016/0100023 | A1 | 4/2016 | Kim |
| 2016/0142293 | A1 | 5/2016 | Hu et al. |
| 2016/0164836 | A1 | 6/2016 | Roberson |
| 2016/0241633 | A1 | 8/2016 | Overby, Jr. et al. |
| 2016/0344841 | A1 | 11/2016 | Wang et al. |
| 2016/0352649 | A1 * | 12/2016 | Lin ............ H04L 67/535 |
| 2016/0373445 | A1 | 12/2016 | Hayton et al. |
| 2017/0006006 | A1 | 1/2017 | Rawcliffe et al. |
| 2017/0006030 | A1 | 1/2017 | Krishnamoorthy et al. |
| 2017/0063968 | A1 | 3/2017 | Kitchen et al. |
| 2017/0070398 | A1 | 3/2017 | Singhal et al. |
| 2017/0111452 | A1 | 4/2017 | Thazhathethil |
| 2017/0206481 | A1 | 7/2017 | Cheeran et al. |
| 2017/0257257 | A1 | 9/2017 | Dawes et al. |
| 2017/0264649 | A1 | 9/2017 | Sonar et al. |
| 2018/0007002 | A1 | 1/2018 | Landgraf |
| 2018/0041437 | A1 | 2/2018 | Nishijima et al. |
| 2018/0081934 | A1 | 3/2018 | Byron et al. |
| 2018/0084073 | A1 | 3/2018 | Walsh et al. |
| 2018/0091391 | A1 | 3/2018 | Turow et al. |
| 2018/0091621 | A1 | 3/2018 | Kuo et al. |
| 2018/0167476 | A1 | 6/2018 | Hoffner et al. |
| 2018/0227298 | A1 | 8/2018 | Khalil et al. |
| 2018/0246944 | A1 | 8/2018 | Yelisetti et al. |
| 2019/0132329 | A1 | 5/2019 | Verberkt et al. |
| 2019/0260757 | A1 | 8/2019 | Ernesti et al. |
| 2019/0268310 | A1 | 8/2019 | Guberman et al. |
| 2019/0306242 | A1 | 10/2019 | Thummalapalli et al. |
| 2020/0036773 | A1 | 1/2020 | Dar et al. |
| 2020/0036811 | A1 | 1/2020 | Dar et al. |
| 2020/0192857 | A1 * | 6/2020 | Schmidt ............ H04L 49/3027 |
| 2020/0249936 | A1 | 8/2020 | Barfield, Jr. |
| 2020/0379774 | A1 * | 12/2020 | Alperovich ......... G06F 12/0804 |
| 2021/0096936 | A1 | 4/2021 | Seshadri et al. |
| 2021/0273990 | A1 | 9/2021 | Dar et al. |
| 2022/0210245 | A1 | 6/2022 | Dar et al. |

FOREIGN PATENT DOCUMENTS

| | | |
|---|---|---|
| WO | 2016016215 | 2/2016 |
| WO | 2017062544 | 4/2017 |
| WO | 2019050508 | 3/2019 |

OTHER PUBLICATIONS

Wikipedia, "Universally Unique Identifier," published Sep. 12, 2019, retrieved on Aug. 22, 2023 from <https://en.wikipedia.org/w/index.php?title=Universally_unique_identifier&oldid=915343615>, 10 pages.

Wikipedia, "Apache Kafka," published Sep. 25, 2019, retrieved on Aug. 22, 2023 from <https://en.wikipedia.org/w/index.php?title=Apache_Kafka&oldid=917781036>, 4 pages.

Amazon, "Amazon Kinesis," published on Sep. 23, 2019, retrieved on Aug. 22, 2023 from <https://aws.amazon.com/kinesis/>, 19 pages.

Pasquier et al., "CamFlow: Managed Data-Sharing for Cloud Services," IEEE Transactions on Cloud Computing, vol. 5, No. 3, 2015, 14 pages.

Rekik et al., "A Comprehensive Framework for Business Process Outsourcing to the Cloud," IEEE International Conference on Services Computing (SCC), 2016, pp. 179-186, 8 pages.

* cited by examiner

FIG. 5A

| DATA CONSUMER REGISTRATION ID | DATA CONSUMER NAME |
|---|---|
| 0066a622-b2ac-4898-9333-44ee019f1e07 | consumer-tenant-1 |
| 3835aaa6-a0ed-460f-86f3-bd92d2752701 | consumer-tenant-2 |

FIG. 5B

| DATA PRODUCER REGISTRATION ID | DATA PRODUCER NAME | DATA BUFFER ID |
|---|---|---|
| 003b15c9-9a96-460e-8924-ae7458afec02 | producer-metrics-tenant-1 | 0066a622-b2ac-4898-9333-44ee019f1e07 |
| ca8e3ff3adcfd275-7f703c5265a63d87 | producer-audit-logs-tenant-1 | d22955c8-2bdc-43b2-bc9d-6c6d12a98db8 |
| ca8e3ff3adcfd275-7f703c5265a63d87 | producer-audit-logs-tenant-2 | ce811934-ea1a-4f53-b6ec-465e6ca7d126 |

FIG. 5C

| DATA CONSUMER REGISTRATION ID | DATA PRODUCER REGISTRATION ID |
|---|---|
| 0066a622-b2ac-4898-9333-44ee019f1e07 | 003b15c9-9a96-460e-8924-ae7458afec02 |
| 0066a622-b2ac-4898-9333-44ee019f1e07 | ca8e3ff3adcfd275-7f703c5265a63d87 |
| 3835aaa6-a0ed-460f-86f3-bd92d2752701 | 0066a622-b2ac-4898-9333-44ee019f1e07 |

METHODS AND APPARATUS FOR DATA PIPELINES BETWEEN CLOUD COMPUTING PLATFORMS

RELATED APPLICATIONS

This patent arises from a continuation of U.S. patent application Ser. No. 16/690,157, (now U.S. Pat. No. 11,347,572) which was filed on Nov. 21, 2019, which claims the benefit under 35 U.S.C. 119(a)-(d) to Indian Application No. 201941038899 filed in India, entitled "METHODS AND APPARATUS FOR DATA PIPELINES BETWEEN CLOUD COMPUTING PLATFORMS", on Sep. 26, 2019, by VMWARE, INC. U.S. patent application Ser. No. 16/690,157 and Indian Application No. 201941038899 are hereby incorporated herein by reference in their entireties. Priority to U.S. patent application Ser. No. 16/690,157 and Indian Application No. 201941038899 is hereby claimed.

FIELD OF THE DISCLOSURE

This disclosure relates generally to cloud computing and, more particularly, to methods and apparatus for data pipelines between cloud computing platforms.

BACKGROUND

"Software-as-a-Service" (also commonly referred to as "SaaS") generally describes a software licensing and distribution model in which software is licensed on a subscription basis and is centrally hosted by third-party providers. The third-party providers make the software available to customers over the Internet. Enterprises may maintain their own business-internal organizational cloud computing platform (sometimes referred to as a "private cloud") and rely on SaaS to facilitate the installation, updating, resourcing, and management of the software procured from the third-party providers.

BRIEF DESCRIPTION OF THE DRAWINGS

FIGS. 5A-5C depict example data mappings included in an example configuration database.

Figure 1:
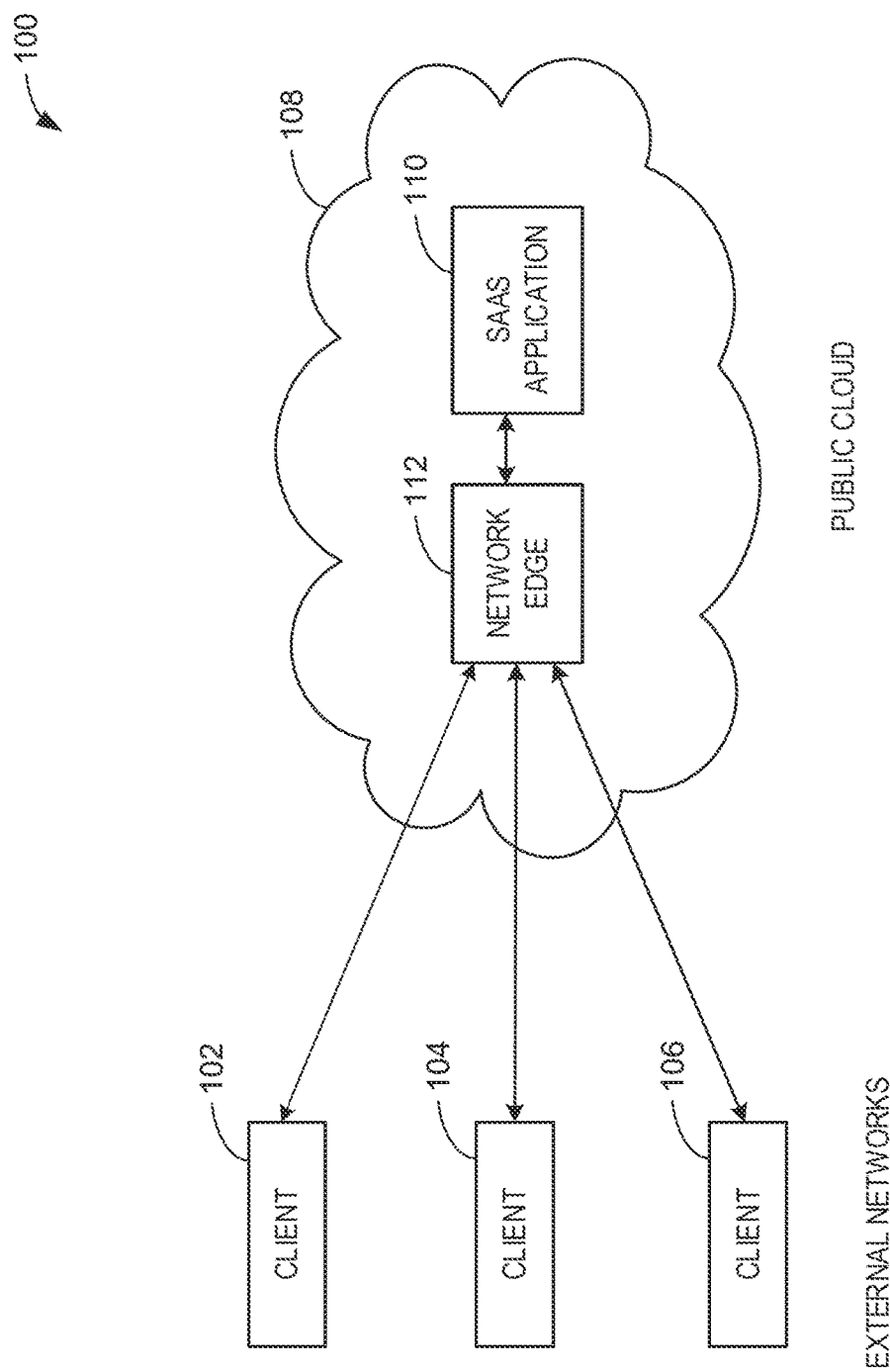
FIG. 1 is a schematic illustration of example clients in communication with an example public cloud.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In conventional software-delivery models, software is delivered as a package to buyers and the buyers would install the software on infrastructure private to their enterprises or organizations. In conventional software-delivery models, the buyers of the software are tasked with the responsibility to install, update, resource, and manage the purchased software.

SaaS can be considered the model of choice for modern software application delivery. In a SaaS model, third-party providers (e.g., service providers, third-party service providers, etc.) deliver and manage software in a centralized manner by having customers buy the software using an on-demand subscription-based model. For instance, the service providers can manage the installation, updating, and resourcing of the purchased software instead of the software purchasers. To facilitate the SaaS model, the service providers manage and maintain their own infrastructure (e.g., compute, network, security, storage, etc., hardware resources) on which the software executes. Advantageously, SaaS models can facilitate the delivery of software and corresponding software patches or upgrades in a continuous manner at a faster rate with less management and maintenance on the software by the software purchaser. Additionally, SaaS models can offer the software purchaser an on-demand pay-as-you-go subscription model instead of locked in price structures.

Typical SaaS models are based on infrastructure provided by the service provider. SaaS services and corresponding infrastructure are sometimes referred to as a "public cloud." Examples of public clouds include Amazon Web Services, Microsoft Azure, and Google Cloud Platform. In contrast with a public cloud, a typical private cloud can correspond to hardware resources (e.g., compute, networking, security, storage, etc., hardware resources) that are procured, configured, and managed within infrastructure of an enterprise or organization.

As used herein, the term "on-premise" can correspond to a location of a private cloud of the enterprise or the organization being on the premises of the enterprise or the organization. For example, a private cloud of an enterprise can be on-premise of the enterprise when physical datacenters including a plurality of computer servers that are leased or owned by the enterprise are in a building, on a property, on a site, etc., associated with the enterprise. Example cloud computing virtualization platforms such as VMWARE® VSPHERE® can be used to facilitate management and/or monitoring of the private clouds. For example, the VMWARE® VSPHERE® virtualization suite is a collection of components to setup and manage a virtual infrastructure of servers, networks, and/or other resources associated with a private cloud.

Interactions between a SaaS application hosted by a public cloud and an external network hosted by a private cloud can be categorized into at least two types of interactions. A first type of interaction can correspond to a synchronous communication interaction where the external network sends a request to the SaaS application. In the first type of interaction, the SaaS application exposes a network connection to public networks, such as the external network, from the public cloud. The external network can wait for a response from the SaaS application to complete the synchronous communication interaction. Such synchronous communication interactions typically correspond to facilitating interactive semantics. The request/response model of the first type of interaction has the disadvantage that a new connection must be established for each request. Establishing new connections over the network is expensive in terms of resources and time and significantly impacts the ability to send potentially large amounts of data.

A second type of interaction can correspond to an asynchronous communication interaction where an external network hosted by a private cloud pushes large volumes of data into a SaaS application hosted by a public cloud. To facilitate high throughput for large quantities of data, the external network pushes the data to the SaaS application but does not wait for a response, which contrasts with the request/response model of the first type of interaction discussed above.

Disadvantageously, the two types of communication interactions discussed above do not facilitate another type of communication interaction where data (e.g., large quantities or volumes of data) originating from the public cloud is to be transferred into the private cloud. As SaaS systems in public clouds and highly inter-connected software systems are being increasingly provided by independent service providers, different use cases can arise where typical cloud computing platforms need to facilitate such a public cloud-to-private cloud communication interaction.

Moreover, data consumers reside in their own network in a private cloud, establishing a connection to the data consumers from the public cloud is not feasible. For example, network protection constructs, such as firewalls, can prevent such connections from forming. In such examples, opening the firewalls can expose the private cloud networks to external attacks. Disadvantageously, a public-to-private cloud connection can expose the private cloud to security breaches, attacks, etc.

Examples disclosed herein establish data pipelines between cloud computing platforms. An example data pipeline service disclosed herein can register data consumers associated with private clouds and data producers associated with public clouds. The example data pipeline service can transfer data originating from the data producers and/or, more generally, the public clouds, to the private clouds.

In some disclosed examples, the data pipeline service exposes example data plane gateways to the private clouds to maintain separation of the data producers from the private clouds. In response to registering at least one of the data consumer or the data producer, the example data pipeline service can generate persistent data buffers to store data originating from the public cloud. The example data pipeline service can store the data in the data buffers to make the data available to the data consumers in either an asynchronous or synchronous manner. The example data pipeline service can determine mappings between at least one of the data consumers, the data producers, or the persistent data buffers to facilitate a distributed data transfer from the public clouds to the private clouds.

FIG. 1 is a schematic illustration of a first example virtual computing environment 100 including example clients 102, 104, 106 in communication with a first example public cloud 108. In FIG. 1, the clients 102, 104, 106 include a first example client 102, a second example client 104, and a third example client 106. The clients 102, 104, 106 of the illustrated example are representative of external networks to the first public cloud 108. For example, one or more of the clients 102, 104, 106 can correspond to an application programming interface (API), a virtualization of a network gateway, etc., and/or a combination thereof.

In the illustrated example of FIG. 1, the first public cloud 108 facilitates execution of an example SaaS application 110. For example, the first public cloud 108 can implement virtualizations of physical hardware resources such as compute resources, networking resources, security resources, storage resources, etc. In such examples, the SaaS application 110 can execute one or more software services on a virtual server rack composed of instances of the physical hardware resource virtualizations managed by and/or otherwise implemented by the first public cloud 108.

In the illustrated example of FIG. 1, the first public cloud 108 includes an example network edge 112 to facilitate a synchronous communication interaction with the clients 102, 104, 106. The network edge 112 of the illustrated example is a virtualization of a physical network interface (e.g., a gateway, a router, a switch, etc.) that is exposed to external entities to the first public cloud 108, such as the clients 102, 104, 106.

In the illustrated example of FIG. 1, the clients 102, 104, 106 facilitate the synchronous communication interaction with the first public cloud 108 by transmitting a request to the network edge 112. For example, the first client 102, after sending a request to the SaaS application 110 via the network edge 112, can wait for a response from the SaaS application 110. In such examples, the request can correspond to interactive semantics, where the clients 102, 104, 106 control an execution, an operation, etc., of the SaaS application 110 by transmitting commands, control actions, etc., in the request. For example, the first virtual computing environment 100 of FIG. 1 can correspond to a control plane, where one or more of the clients 102, 104, 106 can generate a request to adjust, control, and/or otherwise manage an execution of the SaaS application 110 and waits for a response including an acknowledgment or other indication that the request has been completed.

Figure 2:
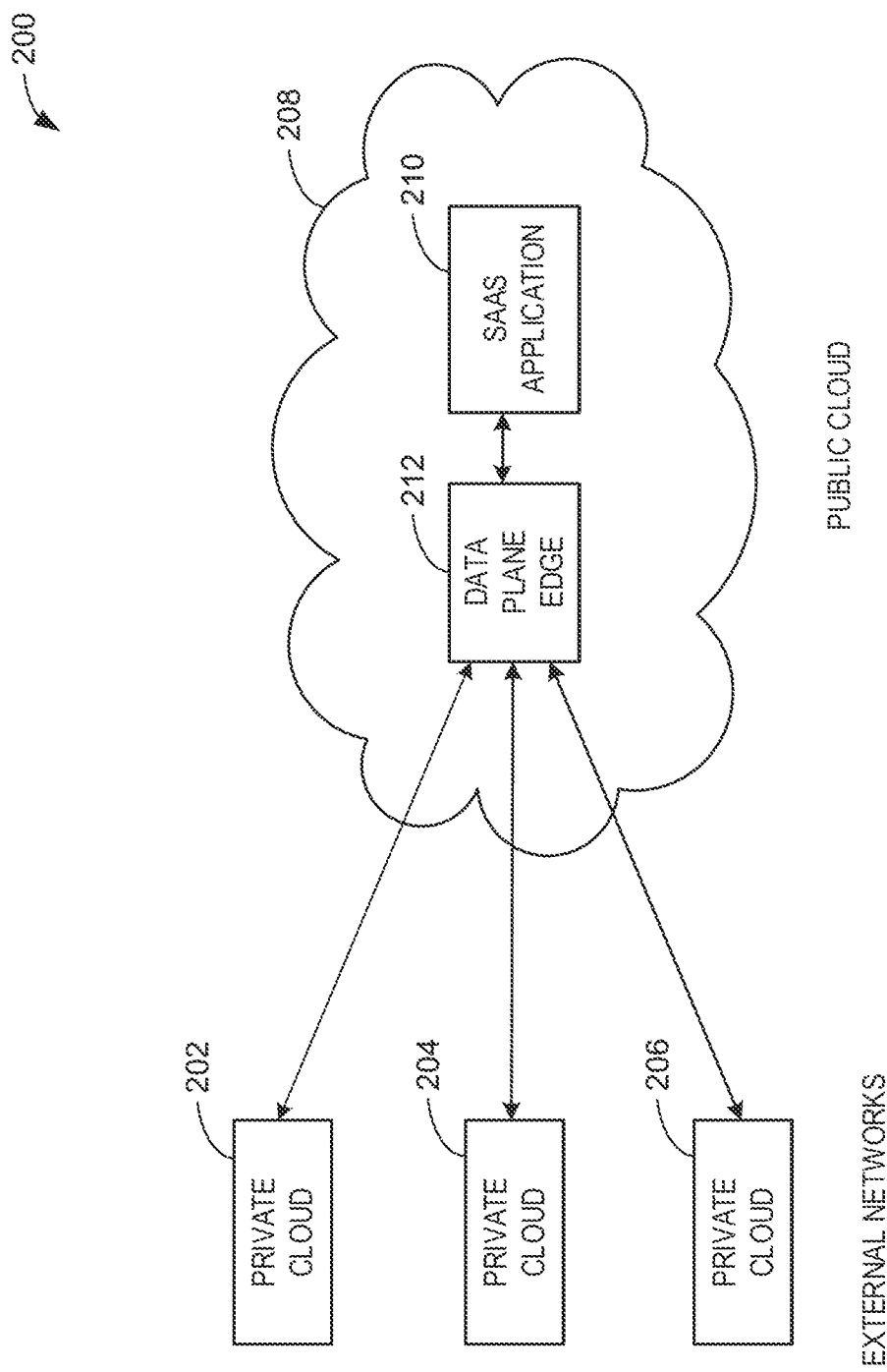
FIG. 2 is a schematic illustration of example private clouds in communication with an example public cloud.

FIG. 2 is a schematic illustration of a second example virtual computing environment 200 including example private clouds 202, 204, 206 in communication with a second example public cloud 208. In FIG. 2, the private clouds 202, 204, 206 include a first example private cloud 202, a second example private cloud 204, and a third example private cloud 206. The private clouds 202, 204, 206 of the illustrated example are representative of external networks to the second public cloud 208. For example, one or more of the private clouds 202, 204, 206 can correspond to virtual server racks managed by and/or otherwise affiliated with an enterprise. In such examples, the virtual server racks can correspond to virtualizations of physical server racks and/or other physical hardware resources that are on-premise of the enterprise.

In the illustrated example of FIG. 2, the second public cloud 208 includes an example SaaS application 210 that can correspond to the SaaS application 110 of FIG. 1. In FIG. 2, the second public cloud 208 includes an example data plane edge 212 to facilitate an asynchronous communication interaction between the SaaS application 210 of FIG. 2 and the private clouds 202, 204, 206. The data plane edge 212 of the illustrated example is a virtualization of a physical network interface (e.g., a gateway, a router, a switch, etc.) that is exposed to external entities to the second public cloud 208, such as the private clouds 202, 204, 206.

In the illustrated example of FIG. 2, the private clouds 202, 204, 206 facilitate the asynchronous communication interaction with the second public cloud 208 by pushing data to the data plane edge 212 without waiting for a response. For example, to achieve a high throughput for potentially large amounts of data, one or more of the private clouds 202, 204, 206 can asynchronously transmit data to the SaaS application 210 via the data plane edge 212 without waiting for an acknowledgment, response, etc., from the second public cloud 208. In such examples, the second virtual computing environment 200 of FIG. 2 can correspond to a data plane, where the SaaS application 210 and/or, more generally, the second public cloud 208 ingests large volumes of data from one or more of the private clouds 202, 204, 206 to facilitate execution of the SaaS application 210.

The second virtual computing environment 200 of FIG. 2 implements a data plane to facilitate high volume data ingestion from the private clouds 202, 204, 206 into the second public cloud 208. In some examples, the data can correspond to events, logs, metrics, etc., to enable the SaaS application 210 executing in the second public cloud 208 to provide services (e.g., software services) such as monitoring, troubleshooting, etc., based on the data from the private clouds 202, 204, 206.

The first virtual computing environment 100 of FIG. 1 does not facilitate data originating from the first public cloud 108 to be transferred to the clients 102, 104, 106 of FIG. 1. The second virtual computing environment 200 of FIG. 2 does not facilitate data originating from the second public cloud 208 to be transferred to the private clouds 202, 204, 206 of FIG. 2.

In some examples, data including logs generated by the second public clouds 208 may need to be relocated to the private clouds 202, 204, 206. For example, the private clouds 202, 204, 206 can include instantiations of third-party provided software that can process such logs. In such examples, the third-party provided software is unable to access the logs stored in the second public cloud 208 because the logs are only available to services executing in the second public cloud 208.

In some examples, alerts, messages, notifications, etc., generated by the second public cloud 208 may need to be consumed in the private clouds 202, 204 206. For example, the private clouds 202, 204, 206 can include instantiations of services such as ticketing systems (e.g., information technology (IT) ticketing systems, bug reporting systems, etc.), audit systems, etc., that generate data, outputs, etc., based on alerts, messages, notifications, etc., of the same type that are generated by the second public cloud 208. However, such services are unable to access such data as the alerts, the messages, the notifications, etc., are only accessible to services executing within the second public cloud 208.

In some examples, telemetry and utilization data associated with customers, users, etc., may be needed to be present on-premise. For example, telemetry and utilization data generated by the first public cloud 108, the second public cloud 208, etc., may need to be stored on-premise instead of the public clouds 108, 208 to satisfy compliance, regulatory, government, etc., rules associated with privacy regulations (e.g., Health Insurance Portability and Accountability Act (HIPPA) privacy rules) or other obligations in connection with the storage and/or use of non-enterprise related data.

Figure 3:
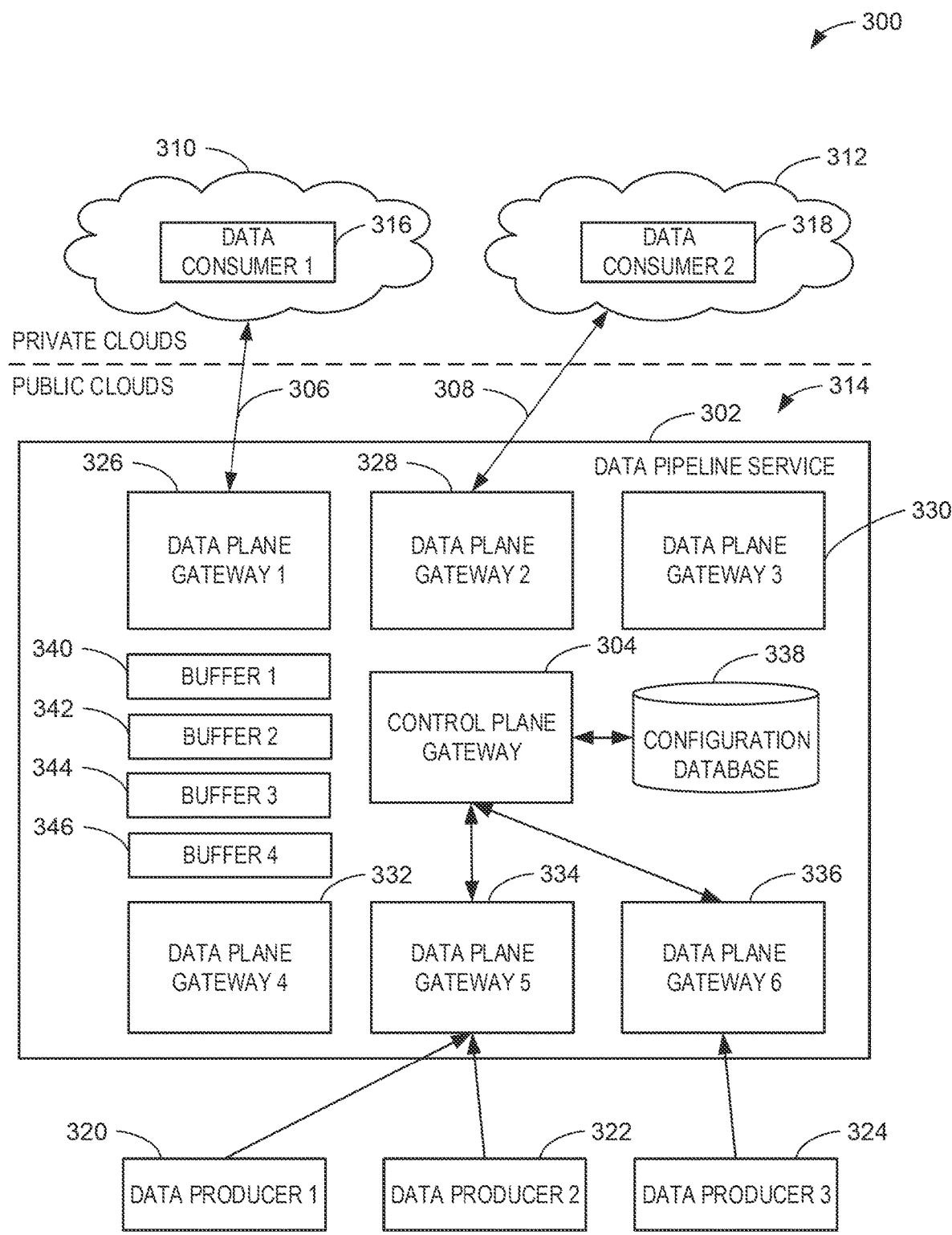
FIG. 3 is an example implementation of a data pipeline service including a control plane gateway to establish data pipelines between an example private cloud and an example public cloud.

FIG. 3 is a third example virtual computing environment 300 including an example implementation of a data pipeline service 302 including a control plane gateway 304 to establish example data pipelines 306, 308 between example private clouds 310, 312 and a third example public cloud 314. In FIG. 3, the data pipelines 306, 308 include a first example data pipeline 306 and a second example data pipeline 308. The data pipelines 306, 308 of the illustrated example are high-volume, secure data pipelines between the third public cloud 314 and the private clouds 310, 312. In FIG. 3, the third virtual computing environment 300 can establish the data pipelines 306, 308 to be data and/or cloud agnostic and implemented at scale.

In the illustrated example of FIG. 3, the private clouds 310, 312 include a first example private cloud 310 and a second example private cloud 312. For example, one or both of the private clouds 310, 312 of FIG. 3 can correspond to the private clouds 202, 204, 206 of FIG. 2. Alternatively, the third virtual computing environment 300 may include fewer or more private clouds than the private clouds 310, 312 depicted in FIG. 3.

In the illustrated example of FIG. 3, the first private cloud 310 includes a first example data consumer 316 and a second example data consumer 318. Alternatively, one or both private clouds 310, 312 may include more than one data consumer. In some examples, the data consumers 316, 318 are agents (e.g., software agents, virtual agents, etc.) that reside in and/or otherwise execute in the private clouds 310, 312. For example, the data consumers 316, 318 can communicate with the data pipeline service 302 and may not be in communication with and/or otherwise exposed to other components of the third public cloud 314. In such examples, the data consumers 316, 318 are not exposed to and/or otherwise are not accessible by the data producers 320, 322, 324.

In some examples, the data consumers 316, 318 are representative of one or more physical or virtual server racks, one or more network interfaces, one or more private cloud SaaS applications, etc., and/or a combination thereof that are associated with an enterprise or organization. For example, the data consumers 316, 318 can be one or more virtual or physical servers. The data consumers 316, 318 of the illustrated example of FIG. 3 receive, obtain, and/or otherwise consume data generated by the third public cloud 314. For example, the third public cloud 314 can generate data and transmit the data to the private clouds 310, 312 for processing, storage, etc.

In some examples, the data generated by and/or transmitted from the third public cloud 314 includes alerts, logs (e.g., data logs, server logs, etc.), messages, metrics, notifications, telemetry data, utilization information (e.g., availability, capacity, performance, etc., information), etc., and/or a combination thereof. As used herein, availability information can refer to information indicative of the level of redundancy required to provide continuous operation expected for one or more SaaS applications, one or more services, etc., hosted by the third public cloud 314. As used herein, performance information can refer to information indicative of the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD), etc.), and power capabilities assigned to the one or more SaaS applications, the one or more services, etc., hosted by the third public cloud 314. As used herein, capacity information can refer to information associated with the aggregate number of resources (e.g., aggregate storage, aggregate CPU, aggregate respective hardware accelerators (e.g., field programmable gate arrays (FPGAs), graphic processing units (GPUs)), etc.) across all servers (e.g., physical hardware servers, virtual server racks, etc.) associated with the one or more SaaS applications, the one or more services, etc., hosted by the third public cloud 314.

In the illustrated example of FIG. 3, the third public cloud 314 includes a first example data producer 320, a second example data producer 322, and a third example data producer 324. Alternatively, the third virtual computing environment 300 may include fewer or more data producers than the data producers 320, 322, 324 depicted in FIG. 3. In some examples, the data producers 320, 322, 324 are agents (e.g., software agents, virtual agents, etc.) that reside in and/or otherwise execute in the third public cloud 314. In some examples, the data producers 320, 322, 324 are representative of one or more physical or virtual server racks, one or more network interfaces, one or more public cloud SaaS applications, etc., and/or a combination thereof that can aggregate, generate, and/or otherwise obtain data to be transmitted to the private clouds 310, 312. For example, the data producers 320, 322, 324 can correspond to one or more physical or virtual hardware resources, one or more virtual or physical servers, etc., that are spun up and/or otherwise instantiated to facilitate a transfer of data from the third public cloud 314 to one or both of the private clouds 310, 312. In FIG. 3, the data producers 320, 322, 324 are not exposed and/or otherwise not accessible to the data consumers 316, 318, and/or, more generally, the private clouds 310, 312.

In the illustrated example of FIG. 3, the third virtual computing environment 300 includes the data pipeline service 302 to facilitate the transmission of data from the third public cloud 314 to one or more of the private clouds 310, 312. The data pipeline service 302 of the illustrated example is a SaaS application. For example, the data pipeline service 302 can be a service executing on a virtual or physical server rack to transfer data from the third public cloud 314 to the private clouds 310, 312. In some examples, the data pipeline service 302 is a controller (e.g., a data pipeline controller, a data pipeline service controller, etc.) representative of, corresponding to, and/or otherwise including one or more controllers to facilitate the transmission of data from the third public cloud 314 to one or more of the private clouds 310, 312. In FIG. 3, the third public cloud 314 includes and/or otherwise instantiates the data pipeline service 302 to be exposed to entities external to the third public cloud 314, such as the private clouds 310, 312. In FIG. 3, the data pipeline service 302 includes the control plane gateway 304, example data plane gateways 326, 328, 330, 332, 334, 336, an example configuration database 338, and example buffers 340, 342, 344, 346.

In the illustrated example of FIG. 3, the data pipeline service 302 includes the data plane gateways 326, 328, 330, 332, 334, 336 to facilitate communication with the data consumers 316, 318 and/or the data producers 320, 322, 324. In some examples, one or more of the data plane gateways 326, 328, 330, 332, 334, 336 are instances of virtualizations of network resources, such as a gateway, a router, a switch, etc. Alternatively, one or more of the data plane gateways 326, 328, 330, 332, 334, 336 may be an API, a network socket of a network interface, etc.

In the illustrated example of FIG. 3, the data plane gateways 326, 328, 330, 332, 334, 336 include a first example data plane gateway 326, a second example data plane gateway 328, a third example data plane gateway 330, a fourth example data plane gateway 332, a fifth example data plane gateway 334, and a sixth example data plane gateway 336. Alternatively, the data pipeline service 302 may include fewer or more data plane gateways than the data plane gateways 326, 328, 330, 332, 334, 336 depicted in FIG. 3.

In the illustrated example of FIG. 3, the first through third data plane gateways 326, 328, 330 are configured to establish data pipelines (e.g., the data pipelines 306, 308 of FIG. 3) to transmit data from the data producers 320, 322, 324 to the data consumers 316, 318 and/or, more generally, the private clouds 310, 312. In some examples, the data consumers 316, 318 invoke and/or otherwise request (e.g., by transmitting a request) one of the first through third data plane gateways 326, 328, 330 to register the requesting one of the data consumers 316, 318 with the control plane gateway 304.

In the illustrated example of FIG. 3, the fourth through sixth data plane gateways 332, 334, 336 are configured to obtain data from the data producers 320, 322, 324. In some examples, the data producers 320, 322, 324 invoke and/or otherwise request (e.g., by transmitting a request) one of the fourth through sixth data plane gateways 332, 334, 336 to register the requesting one of the data producers 320, 322, 324 with the control plane gateway 304.

In the illustrated example of FIG. 3, the data pipeline service 302 includes the buffers 340, 342, 344, 346 to store data obtained from the data producers 320, 322, 324 and to prevent data loss in the event of transient communication problems between the first through third data plane gateways 326, 328, 330 and the data consumers 316, 318. The buffers 340, 342, 344, 346 are persistent storage. For example, the buffers 340, 342, 344, 346 can store data from the data producers 320, 322, 324 for a time period (e.g., an hour, a day, a week, etc.). In other examples, the buffers 340, 342, 344, 346 can be first-in first-out (FIFO) buffers, circular buffers, or any other type of buffer. In FIG. 3, the buffers 340, 342, 344, 346 include a first example buffer 340, a second example buffer 342, a third example buffer 344, and a fourth example buffer 346. Alternatively, the control plane gateway 304 may include fewer or more buffers than the buffers 340, 342, 344, 346 depicted in FIG. 3.

In the illustrated example of FIG. 3, the data pipeline service 302 includes the control plane gateway 304 to orchestrate, manage, and/or otherwise control data flow operations between the data producers 320, 322, 324 and the data consumers 316, 318 of FIG. 3. In example operation, the control plane gateway 304 obtains a request from one of the data consumers 316, 318 to establish a public-to-private cloud data connection. For example, the first data consumer 316 can transmit a request including consumer registration information to the first data plane gateway 326 to establish the first data pipeline 306.

In example operation, the control plane gateway 304 can register one or more of the data consumers 316, 318 based on the consumer registration information. The control plane gateway 304 can select one or more of the data producers 320, 322, 324 to register with the control plane gateway 304. For example, the control plane gateway 304 can register one or more of the data producers 320, 322, 324 based on producer registration information obtained from the one or more of the data producers 320, 322, 324.

In some examples, the control plane gateway 304 registers one or more of the data consumers 316, 318 by generating first mapping information. The first mapping information can correspond to and/or otherwise include entries in an example consumer mapping table (e.g., a data consumer mapping table) 500 illustrated in FIG. 5A. In some examples, the control plane gateway 304 registers one or more of the data producers 320, 322, 324 by generating second mapping information. The second mapping information can correspond to and/or otherwise include entries in an example producer mapping table (e.g., a data producer mapping table) 510 illustrated in FIG. 5B. In some examples, the control plane gateway 304 generates third mapping information to associate the data consumers 316, 318 and the data producers 320, 322, 324 based on the first mapping information and/or the second mapping information. The third mapping information can correspond to and/or otherwise include entries in an example consumer-to-producer mapping table (e.g., a data consumer-to-data producer mapping table) 520 illustrated in FIG. 5C.

In some examples, in response to the registration(s), the control plane gateway 304 can generate and configure one or more of the buffers 340, 342, 344, 346. The control plane gateway 304 can establish a connection between one or more of the data producers 320, 322, 324 and one or more of the fourth through the sixth data plane gateways 332, 334, 336. One or more of the data producers 320, 322, 324 can transmit data originating within the third public cloud 314 to one or more of the buffers 340, 342, 344, 346 via one or more of the fourth through the sixth data plane gateways 332, 334, 336. The control plane gateway 304 can establish one or more data pipelines, such as the first data pipeline 306, the second data pipeline 308, etc., between one or more of the data consumers 316, 318 and one or more of the first through third data plane gateways 326, 328, 330. In response to establishing the one or more data pipelines, the control plane gateway 304 can stream and/or otherwise transmit data from one or more of the buffers 340, 342, 344, 346 to one or more of the data consumers 316, 318 via one or more of the first through third data plane gateways 326, 328, 330.

In example operation, in response to the first data consumer 316 and the first data producer 320 registering with the data pipeline service 302, the first data producer 320 can transmit data generated by the third public cloud 314 to the fifth data plane gateway 334. The fifth data plane gateway 334 can transmit a request to the control plane gateway 304 to determine where to transmit the data obtained from the first data producer 320. In such examples, the control plane gateway 304 can extract a first name of the first data producer 320 from the request.

In example operation, the control plane gateway 304 can map the first name to the producer mapping table 510 stored in the configuration database 338 to determine that the first name corresponds to a first producer registration identifier and a first buffer identifier. Based on the mapping, the control plane gateway 304 can return the first buffer identifier to the fifth data plane gateway 334. The fifth data plane gateway 334 can transmit the data obtained from the first data producer 320 to the first buffer 340 in response to identifying the first buffer 340 based on the first buffer identifier.

In example operation, the first data consumer 316 can transmit a request to the first data plane gateway 326 to obtain data generated by the third public cloud 314. The control plane gateway 304 can extract a second name of the first data consumer 316 from the request. The control plane gateway 304 can map the second name to a first consumer registration identifier in the consumer mapping table 500 stored in the configuration database 338. The control plane gateway 304 can map the first consumer registration identifier to the first buffer identifier in the producer mapping table 510 stored in the configuration database 338. Based on the mappings, the control plane gateway 304 can invoke the first data plane gateway 326 to obtain the data stored in the first buffer 340 and transmit the data to the first data consumer 316 via the first data pipeline 306.

In the illustrated example of FIG. 3, the data pipeline service 302 includes the configuration database 338 to record data (e.g., consumer registration information, producer registration information, buffer configuration information, mapping information, the consumer mapping table 500 of FIG. 5A, the producer mapping table 510 of FIG. 5B, the consumer-to-producer mapping table 520 of FIG. 5C, etc.). The configuration database 338 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The configuration database 338 may additionally or alternatively be implemented by one or more double data rate (DDR) memories, such as DDR, DDR2, DDR3, DDR4, mobile DDR (mDDR), etc. The configuration database 338 may additionally or alternatively be implemented by one or more mass storage devices such as hard disk drive(s), compact disk drive(s), digital versatile disk drive(s), solid-state disk drive(s), etc. While in the illustrated example the configuration database 338 is illustrated as a single database, the configuration database 338 may be implemented by any number and/or type(s) of databases. Furthermore, the data stored in the configuration database 338 may be in any data format such as, for example, binary data, comma delimited data, tab delimited data, structured query language (SQL) structures, etc.

While an example manner of implementing the data pipeline service 302 of FIG. 3 is illustrated in FIG. 3, one or more of the elements, processes and/or devices illustrated in FIG. 3 may be combined, divided, re-arranged, omitted, eliminated and/or implemented in any other way. Further, the example control plane gateway 304, the example data plane gateways 326, 328, 330, 332, 334, 336, the example configuration database 338, the example buffers 340, 342, 344, 346, and/or, more generally, the example data pipeline service 302 of FIG. 3 may be implemented by hardware, software, firmware and/or any combination of hardware, software and/or firmware. Thus, for example, any of the example control plane gateway 304, the example data plane gateways 326, 328, 330, 332, 334, 336, the example configuration database 338, the example buffers 340, 342, 344, 346, and/or, more generally, the example data pipeline service 302 could be implemented by one or more analog or digital circuit(s), logic circuits, programmable processor(s), programmable controller(s), GPU(s), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example control plane gateway 304, the example data plane gateways 326, 328, 330, 332, 334, 336, the example configuration database 338, and/or the example buffers 340, 342, 344, 346 is/are hereby expressly defined to include a non-transitory computer readable storage device or storage disk such as a memory, a digital versatile disk (DVD), a compact disk (CD), a Blu-ray disk, etc. including the software and/or firmware. Further still, the example data pipeline service 302 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
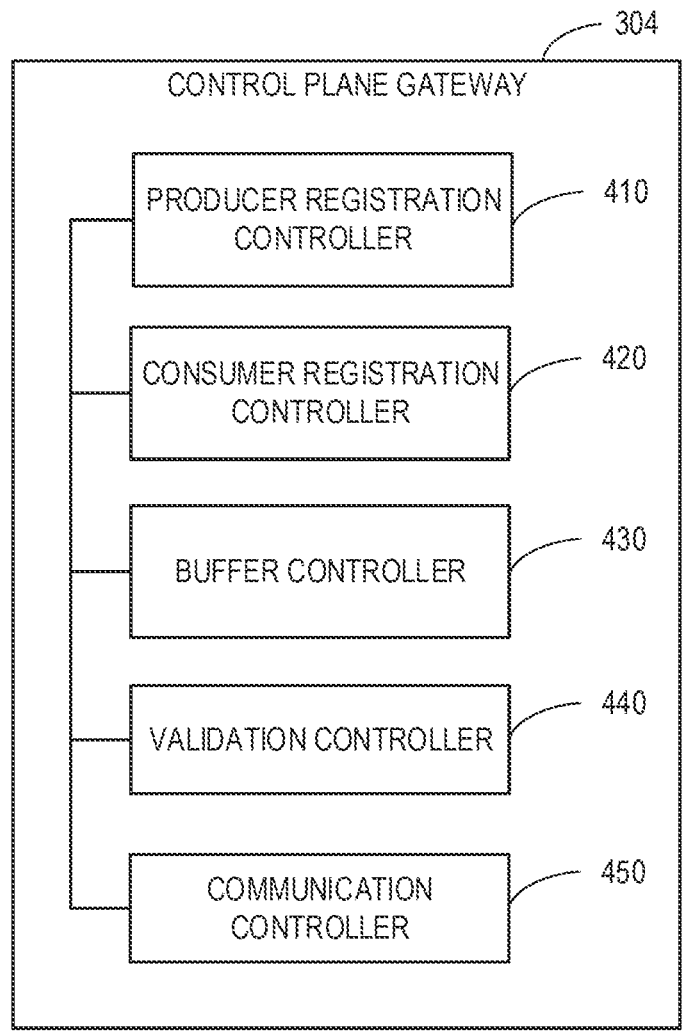
FIG. 4 is an example implementation of the control plane gateway of FIG. 3.

FIG. 4 is an example implementation of the control plane gateway 304 of FIG. 3. In the illustrated example of FIG. 3, the control plane gateway 304 includes an example producer registration controller 410, an example consumer registration controller 420, an example buffer controller 430, an example validation controller 440, and an example communication controller 450.

In the illustrated example of FIG. 4, the control plane gateway 304 includes the producer registration controller 410 to register one or more of the data producers 320, 322, 324 of FIG. 3 to cause the one or more of the data producers 320, 322, 324 to transmit data to one or more of the buffers 340, 342, 344, 346 of FIG. 3. In some examples, the producer registration controller 410 obtains a request from one of the data producers 320, 322, 324. For example, the producer registration controller 410 can obtain a request from the first data producer 320 to register with the data pipeline service 302 of FIG. 3. In such examples, the producer registration controller 410 can extract producer registration information from the request. For example, the producer registration information can include a name (e.g., a data producer name) of the first data producer 320.

In some examples, in response to determining the name of the first data producer 320, the producer registration controller 410 can generate a producer registration identifier based on the name. For example, the producer registration controller 410 can generate a universally unique identifier (UUID) for the first data producer 320. In some examples, the producer registration controller 410 can store the name and/or the producer registration identifier in the producer mapping table 510 of FIG. 5B stored in the configuration database 338 of FIG. 3.

In some examples, the producer registration controller 410 maps the name and the producer registration identifier to one of the buffers 340, 342, 344, 346 by storing a corresponding buffer registration identifier (e.g., a buffer UUID) in the producer mapping table 510. For example, the producer registration controller 410 can store an association of the producer registration identifier and one or more of the buffers 340, 342, 344, 346 in the configuration database 338. In some examples, the producer registration controller 410 generates and stores a buffer identifier corresponding to the one of the buffers 340, 342, 344, 346 in the producer mapping table 510 of FIG. 5B. In some examples, the producer registration controller 410 can invoke the buffer controller 430 to generate and store a buffer identifier corresponding to the one of the buffers 340, 342, 344, 346 in the producer mapping table 510 of FIG. 5B.

In the illustrated example of FIG. 4, the control plane gateway 304 includes the consumer registration controller 420 to register one or more of the data consumers 316, 318 of FIG. 3 to obtain data from one or more of the data producers 320, 322, 324 via one or more of the buffers 340, 342, 344, 346 of FIG. 3. In some examples, the consumer registration controller 420 obtains a request from one of the data consumers 316, 318. For example, the consumer registration controller 420 can obtain a request from the first data consumer 316 to register with the data pipeline service 302 of FIG. 3. In such examples, the consumer registration controller 420 can extract consumer registration information from the request. For example, the consumer registration information can include a first name (e.g., a data consumer name) of the first data consumer 316 and/or one or more second names (e.g., a list of one or more data producer names) associated with one or more of the data producers 320, 322, 324.

In some examples, in response to extracting the first name and/or the one or more second names from the request, the consumer registration controller 420 can invoke the validation controller 440 to validate each of the one or more second names. In response to validating each of the one or more second names, the consumer registration controller 420 can generate a consumer registration identifier based on the first name. For example, the consumer registration controller 420 can generate a UUID for the first data consumer 316.

In some examples, the consumer registration controller 420 can store the first name and/or the consumer registration identifier in the consumer mapping table 500 of FIG. 5A stored in the configuration database 338 of FIG. 3. In some examples, the consumer registration controller 420 retrieves one or more producer registration identifiers by mapping the one or more second names to the one or more producer registration identifiers in the producer mapping table 510 stored in the configuration database 338.

In some examples, the consumer registration controller 420 generates the consumer-to-producer mapping table 520 of FIG. 5C. For example, the consumer registration controller 420 can store a first consumer registration identifier corresponding to the first data consumer 316 in the consumer-to-producer mapping table 520. In such examples, the consumer registration controller 420 can store a first producer registration identifier retrieved from the producer mapping table 510 at a corresponding entry in the consumer-to-producer mapping table 520 to establish an association between the first data consumer 316 and the first data producer 320 by mapping the first consumer registration identifier to the first producer registration identifier in the consumer-to-producer mapping table 520.

In the illustrated example of FIG. 4, the control plane gateway 304 includes the buffer controller 430 to generate and/or configure the buffers 340, 342, 344, 346 of FIG. 3. In some examples, the buffer controller 430 can generate one of the buffers 340, 342, 344, 346 during a registration of one of the data producers 320, 322, 324. For example, in response to the producer registration controller 410 generating a producer registration identifier that corresponds to the first data producer 320, the buffer controller 430 can generate and configure the first buffer 340 to obtain data from the first data producer 320. In such examples, the buffer controller 430 can generate a buffer identifier and store the buffer identifier in the producer mapping table 510 of FIG. 5B at an entry that corresponds to the producer registration identifier that corresponds to the first data producer 320.

In some examples, the buffer controller 430 directs or instructs the fourth through sixth data plane gateways 332, 334, 336 of FIG. 3 to transfer data to one or more of the buffers 340, 342, 344, 346. For example, the buffer controller 430 can retrieve a first buffer identifier from the configuration database 338 that corresponds to and/or otherwise identifies the first buffer 340 and (2) transmit the first buffer identifier to the fifth data plane gateway 334 of FIG. 3. In such examples, in response to obtaining the first buffer identifier, the fifth data plane gateway 334 can transmit data obtained from the first data producer 320 to the first buffer 340.

In the illustrated example of FIG. 4, the control plane gateway 304 includes the validation controller 440 to verify that names included in requests for data are validated based on at least one of the consumer mapping table 500 of FIG. 5A, the producer mapping table 510 of FIG. 5B, or the consumer-to-producer mapping table 520 of FIG. 5C. In some examples, the validation controller 440 validates a data consumer name by comparing the data consumer name to the consumer mapping table 500 of FIG. 5A. If the data consumer name is not included in the consumer mapping table 500 and/or otherwise cannot be resolved, the validation controller 440 can reject a request including the unresolved data producer name and generate an alert indicative of the rejection. For example, the validation controller 440 can generate and transmit an alert to a computing device associated with the requester (e.g., a computing device associated with the first private cloud 310, the second private cloud 312, the first data consumer 316, the second data consumer 318, etc.).

In some examples, the validation controller 440 validates a data producer name included in a request by one of the data consumers 316, 318 or one of the data producers 320, 322, 324 by comparing the data producer name to the producer mapping table 510 of FIG. 5B. If the data producer name is not included in the producer mapping table 510 and/or otherwise cannot be resolved, the validation controller 440 can reject the request and generate an alert indicative of the rejection. For example, the validation controller 440 can generate and transmit an alert to a computing device associated with the requester (e.g., a computing device associated with the first private cloud 310, the second private cloud 312, the first data consumer 316, the second data consumer 318, etc.). In such examples, the validation controller 440 can generate the alert to include an indication that a registration of one or more of the data consumers 316, 318, one or more of the data producers 320, 322, 324, etc., cannot be completed.

In the illustrated example of FIG. 4, the control plane gateway 304 includes the communication controller 450 to invoke the data plane gateways 326, 328, 330, 332, 334, 336 to obtain and/or transmit data. In some examples, the communication controller 450 can invoke one or more of the first through third data plane gateways 326, 328, 330 to obtain data from one or more of the buffers 340, 342, 344, 346. In some examples, the communication controller 450 can invoke one of the first through third data plane gateways 326, 328, 330 to transmit data obtained from one or more of the buffers 340, 342, 344, 346 to one or both of the data consumers 316, 318 and/or, more generally, to one or both of the private clouds 310, 312 of FIG. 3.

In some examples, the communication controller 450 can establish a connection (e.g., a persistent connection), a data pipeline (e.g., a persistent data pipeline, one or both of the data pipelines 306, 308 of FIG. 3, etc.), etc., by keeping alive and/or otherwise maintaining data socket(s), data port(s), etc., in a state to facilitate data flow. In some examples, the communication controller 450 can determine that a request has been received at one or more of the data plane gateways 326, 328, 330, 332, 334, 336. For example, the communication controller 450 can determine that a request (e.g., a request to establish a connection, a data pipeline, etc.) has been received at the first data plane gateway 326 from the first data consumer 316. In other examples, the communication controller 450 can determine that a request (e.g., a request to transmit data, a request to establish a connection, a data pipeline, etc.) has been received at the fifth data plane gateway 334 from the first data producer 320.

In some examples, the communication controller 450 extracts connection information, such as consumer connection information or producer connection information from a request obtained by a data plane gateway. For example, the communication controller 450 can determine that the first data plane gateway 326 has received a request from the first data consumer 316. In such examples, the communication controller 450 can extract consumer connection information from the request including a consumer name associated with the first data consumer 316, one or more producer names associated with the data producers 320, 322, 324, etc., and/or a combination thereof. In other examples, the communication controller 450 can determine that the fifth data plane gateway 334 has received a request from the first data producer 320. In such examples, the communication controller 450 can extract producer connection information from the request including a producer name associated with the first data producer 320.

While an example manner of implementing the control plane gateway 304 of FIG. 3 is illustrated in FIG. 4, one or more of the elements, processes and/or devices illustrated in FIG. 4 may be combined, divided, re-arranged, omitted, eliminated and/or implemented in any other way. Further, the example producer registration controller 410, the example consumer registration controller 420, the example buffer controller 430, the example validation controller 440, the example communication controller 450, and/or, more generally, the example control plane gateway 304 of FIG. 3 may be implemented by hardware, software, firmware and/or any combination of hardware, software and/or firmware. Thus, for example, any of the example producer registration controller 410, the example consumer registration controller 420, the example buffer controller 430, the example validation controller 440, the example communication controller 450, and/or, more generally, the example control plane gateway 304 could be implemented by one or more analog or digital circuit(s), logic circuits, programmable processor(s), programmable controller(s), GPU(s), DSP(s), ASIC(s), PLD(s) and/or FPLD(s). When reading any of the apparatus or system claims of this patent to cover a purely software and/or firmware implementation, at least one of the example producer registration controller 410, the example consumer registration controller 420, the example buffer controller 430, the example validation controller 440, and/or the example communication controller 450 is/are hereby expressly defined to include a non-transitory computer readable storage device or storage disk such as a memory, a DVD, a CD, a Blu-ray disk, etc. including the software and/or firmware. Further still, the example control plane gateway 304 of FIG. 3 may include one or more elements, processes and/or devices in addition to, or instead of, those illustrated in FIG. 4, and/or may include more than one of any or all of the illustrated elements, processes and devices.

In the illustrated example of FIG. 4, the producer registration controller 410 includes first means for registering a data producer with a control plane gateway in a public cloud network. In some examples, the first means for registering is to extract a first name of the data producer and a second name of a data consumer from a request from the data consumer to a control plane gateway, the request to register the data consumer, in response to a validation of the first name, generate a data consumer identifier based on the second name, store a first association of the second name and the data consumer identifier, map the data consumer identifier to a data producer identifier associated with the first name based on the first association, and store a second association of the data consumer identifier and the data producer identifier in a database. In this example, the first means for registering is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 4, the consumer registration controller 420 includes second means for registering a data consumer with a control plane gateway. In some examples, the second means for registering is to extract a first name of a data producer and a second name of the data consumer from a request from the data consumer to a control plane gateway, the request to register the data consumer, in response to a validation of the first name, generate a data consumer identifier based on the second name, map the data consumer identifier to a data producer identifier associated with the first name, and store an association of the data consumer identifier and the data producer identifier in a database. In this example, the second means for registering is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 4, the buffer controller 430 includes means for determining a data buffer identifier by mapping a data producer identifier to a data buffer identifier in a database. In some examples, the means for determining is to map a data consumer identifier to the data buffer identifier in the database. In this example, the means for determining is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 4, the validation controller 440 includes means for validating a data producer by mapping a first name (e.g., a first name of the data producer) to a data producer identifier in a database. In some examples, the means for validating is to validate a data consumer by mapping a second name (e.g., a second name of the data consumer) to a data consumer identifier in the database. In this example, the means for validating is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 4, the communication controller 450 includes means for transmitting to, in response to a registration of a data consumer, transmit data generated by a public cloud network from the data consumer to a data buffer via a first data plane gateway, and, in response to a validation of the data consumer, transmit the data from the data buffer to the data consumer via a second data plane gateway.

In some examples, the communication controller 450 includes means for extracting a first name of a data producer and data from a request from the data producer to a first data plane gateway. In some examples, the means for extracting is to extract a second name of a data consumer from a request from the data consumer to a second data plane gateway.

In some examples, the communication controller 450 includes means for invoking a first data plane gateway to transmit data from the first data plane gateway to a data buffer. In some examples, the means for invoking is to invoke a second data plane gateway to transmit the data from the data buffer to a data consumer.

In some examples, the communication controller 450 includes means for transmitting a list of data streams subscribed to by a data consumer, the list of data streams including a first data stream associated with a first data buffer identified by a first data buffer identifier and a second data stream associated with a second data buffer identified by a second data buffer identifier, and transmit at least one of the first data stream or the second data stream to the data consumer.

In these examples in connection with the communication controller 450, the means for transmitting, the means for extracting, and the means for invoking are implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

FIGS. 5A-5C depict example implementations of data mappings included in the configuration database 338 of FIG. 3. FIG. 5A depicts an example implementation of the consumer mapping table 500. In FIG. 5A, the consumer mapping table 500 includes a first column 502 including entries that correspond to consumer registration identifiers or data consumer registration identifiers (DATA CONSUMER REGISTRATION ID). The consumer registration identifiers are data consumer identifiers. In FIG. 5A, the consumer mapping table 500 includes a second column 504 including entries that correspond to consumer names (DATA CONSUMER NAME).

In some examples, the consumer registration controller 420 of FIG. 4 generates the consumer mapping table 500. For example, the consumer registration controller 420 can extract a consumer name (e.g., "consumer-tenant-1," "consumer-tenant-2," etc.) from a request and store the consumer name in the second column 504. In such examples, the consumer registration controller 420 can generate a UUID (e.g., "0066a622-b2ac-4898-9333-44ee019f1e07," "3835aaa6-a0ed-460f-86f3-bd92d2752701," etc.) for the consumer registration identifier and store the UUID in the first column 502. Accordingly, the consumer registration controller 420 can store an association of the consumer name and a consumer registration identifier based on information included in the first column 502 and the second column 504.

FIG. 5B depicts an example implementation of the producer mapping table 510. In FIG. 5B, the producer mapping table 510 includes a first column 512 including entries that correspond to producer registration identifiers or data producer registration identifiers (DATA PRODUCER REGISTRATION ID). The producer registration identifiers are data producer identifiers. In FIG. 5B, the producer mapping table 510 includes a second column 514 including entries that correspond to producer names (DATA PRODUCER NAME). In FIG. 5B, the producer mapping table 510 includes a third column 516 including entries that correspond to buffer identifiers or data buffer identifiers (DATA BUFFER ID).

In some examples, the producer registration controller 410 of FIG. 4 generates the producer mapping table 510. For example, the producer registration controller 410 can extract a data producer name (e.g., "producer-metrics-tenant-1," "producer-audit-logs-tenant-1," "producer-audit-logs-tenant-2," etc.) from a request and store the data producer name in the second column 514 of the producer mapping table 510. In such examples, the producer registration controller 410 can generate a UUID (e.g., "003b15c9-9a96-460e-8924-ae7458afec02," "ca8e3ff3adcfd275-7f703c5265a63d87," etc.) for the producer registration identifier and store the UUID in the first column 512 of the producer mapping table 510. Accordingly, the producer registration controller 410 can store an association of the data producer name and a producer registration identifier based on information included in the first column 512 and the second column 514 of the producer mapping table 510.

In some examples, the buffer controller 430 of FIG. 4 generates one of the buffers 340, 342, 344, 346 of FIG. 3, generates a corresponding buffer identifier, and stores the buffer identifier in the third column 516 of the producer mapping table 510. Accordingly, the producer registration controller 410 and/or the buffer controller 430 can store an association of the data producer name, the producer registration identifier, and the buffer identifier based on information included in the first column 512, the second column 514, and the third column 516 of the producer mapping table 510.

FIG. 5C depicts an example implementation of the consumer-to-producer mapping table 520. In FIG. 5C, the consumer-to-producer mapping table 520 includes a first column 522 including entries that correspond to the consumer registration identifiers of the first column 502 of the consumer mapping table 500 of FIG. 5A. In FIG. 5C, the consumer-to-producer mapping table 520 includes a second column 524 including entries that correspond to the producer registration identifiers of the first column 512 of the producer mapping table 510 of FIG. 5B. In some examples, the consumer registration controller 420 of FIG. 4 generates the consumer-to-producer mapping table 520. For example, in response to registering one or more of the data consumers 316, 318 of FIG. 3, one or more of the data producers 320, 322, 324 of FIG. 3, etc., and/or a combination thereof, the consumer registration controller 420 can generate associations between the data consumers 316, 318 and the data producers 320, 322, 324 based on information included in the first column 522 and the second column 524 of the consumer-to-producer mapping table 520.

Flowcharts representative of example hardware logic, machine readable instructions, hardware implemented state machines, and/or any combination thereof for implementing the example control plane gateway 304 of FIGS. 3 and/or 4, and/or, more generally, the data pipeline service 302 of FIG. 3 are shown in FIGS. 6-11. The machine readable instructions may be one or more executable programs or portion(s) of an executable program for execution by a computer processor such as the processor 1212 shown in the example processor platform 1200 discussed below in connection with FIG. 12 and/or a computer processor such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1212 of FIG. 12 and/or the processor 1312 of FIG. 13, but the entire program and/or parts thereof could alternatively be executed by a device other than the processor 1212 of FIG. 12 and/or the processor 1312 of FIG. 13 and/or embodied in firmware or dedicated hardware. Further, although the example program is described with reference to the flowcharts illustrated in FIGS. 6-11, many other methods of implementing the example control plane gateway 304, and/or, more generally, the data pipeline service 302 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), SQL, Swift, etc.

As mentioned above, the example processes of FIGS. 6-11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 6:
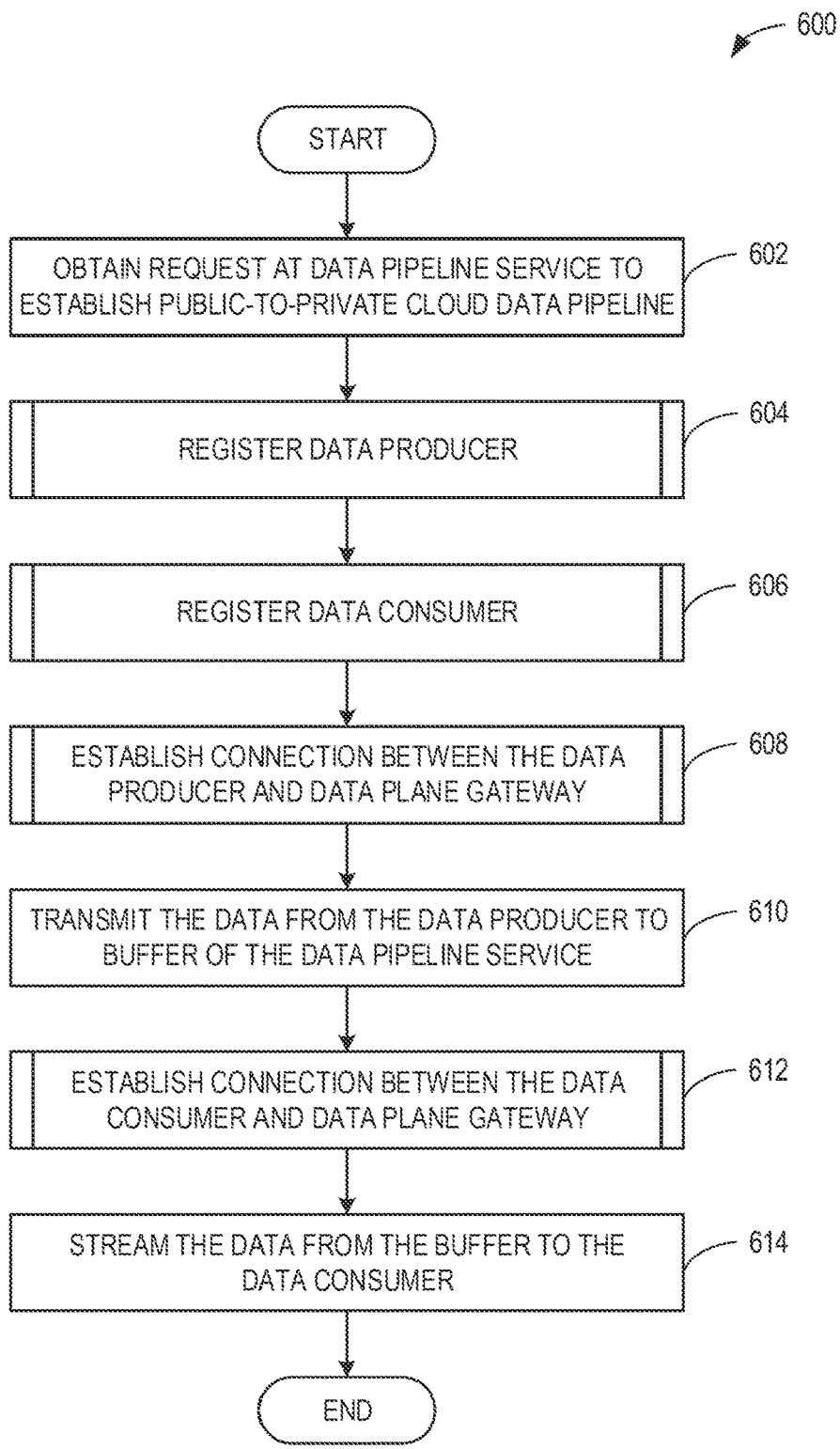
FIG. 6 is a flowchart representative of example machine readable instructions that may be executed to implement the control plane gateway of FIGS. 3 and/or 4, and/or, more generally, the data pipeline service of FIG. 3 to stream data from the example public cloud of FIG. 3 to the example private cloud of FIG. 3.

FIG. 6 is a flowchart representative of example machine readable instructions 600 that may be executed to implement the control plane gateway 304 of FIGS. 3 and/or 4, and/or, more generally, the data pipeline service 302 of FIG. 3 to stream data from the third public cloud 314 of FIG. 3 to one or more of the private clouds 310, 312 of FIG. 3. The machine readable instructions 600 of FIG. 6 begin at block 602, at which the data pipeline service 302 obtains a request to establish a public-to-private cloud data pipeline. For example, the communication controller 450 (FIG. 4) can obtain a request from the first data consumer 316 to establish a data pipeline (e.g., the first data pipeline 306) to transfer data from the third public cloud 314. For example, the request can be transmitted from the first data consumer 316 to the first data plane gateway 326 of FIG. 3. In such examples, the first data consumer 316 can be a customer (e.g., a customer having a consumer name of "consumer-tenant-2") of a log management solution provided by the SaaS application 110 of FIG. 1, the SaaS application 210 of FIG. 2, etc. The customer can transmit the request to obtain audit logs generated by the SaaS application 110, 210 and process the audit logs on-premise.

At block 604, the control plane gateway 304 registers a data producer. For example, the producer registration controller 410 (FIG. 4) can register one or more of the data producers 320, 322, 324 of FIG. 3 based on information included in the request obtained at block 602. An example process that may be executed to implement block 604 is described below in connection with FIG. 7.

At block 606, the control plane gateway 304 registers a data consumer. For example, the consumer registration controller 420 (FIG. 4) can register one or more of the data consumers 316, 318 of FIG. 3 based on information included in the request obtained at block 602. An example process that may be executed to implement block 606 is described below in connection with FIG. 8.

At block 608, the control plane gateway 304 establishes a connection between the data producer and a data plane gateway. For example, the communication controller 450 can invoke the fifth data plane gateway 334 of FIG. 3 to obtain data from the first data producer 320, the second data producer 322, etc. An example process that may be executed to implement block 608 is described below in connection with FIG. 9.

At block 610, the control plane gateway 304 transmits the data from the data producer to a buffer of the data pipeline service 302. For example, the buffer controller 430 (FIG. 4) can transmit a buffer identifier identifying the first buffer 340 to the fifth data plane gateway 334. In such examples, the fifth data plane gateway 334 can transmit data obtained from one of the data producers 320, 322, 324 to the first buffer 340.

At block 612, the control plane gateway 304 establishes a connection between the data consumer and a data plane gateway. For example, the communication controller 450 can establish the first data pipeline 306 to transfer data from the third public cloud 314 to the first private cloud 310 via the first data plane gateway 326. An example process that may be executed to implement block 612 is described below in connection with FIG. 10.

At block 614, the control plane gateway 304 streams the data from the buffer to the data consumer. For example, the communication controller 450 can invoke the first data plane gateway 326 to obtain the data from the first buffer 340 and transmit the data to the first data consumer 316 via the first data pipeline 306. In response to streaming the data from the buffer to the data consumer at block 614, the machine readable instructions 600 of FIG. 6 conclude.

Figure 7:
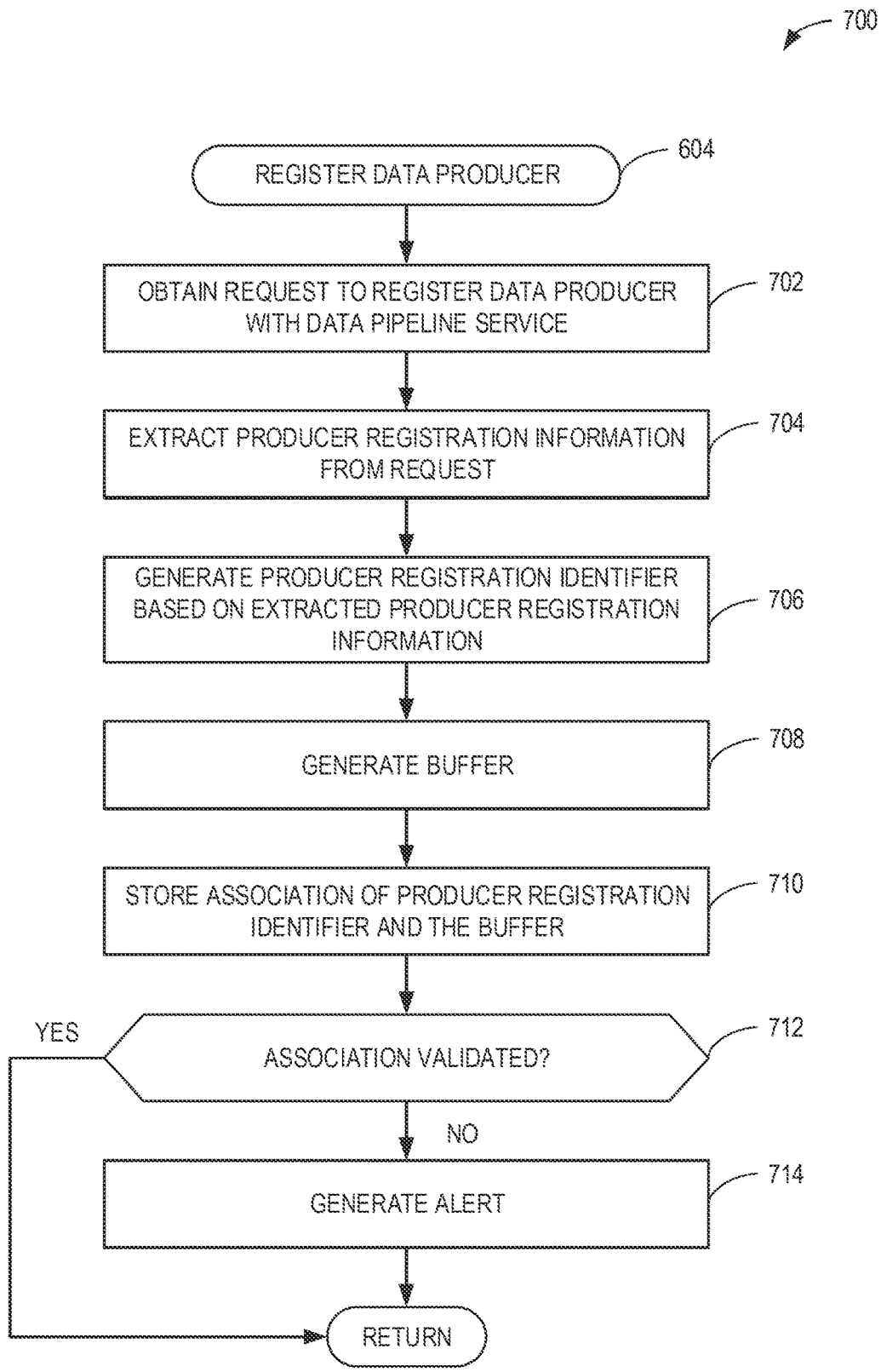
FIG. 7 is a flowchart representative of example machine readable instructions that may be executed to implement the control plane gateway of FIGS. 3 and/or 4, and/or, more generally, the data pipeline service of FIG. 3 to register a data producer.

FIG. 7 is a flowchart representative of example machine readable instructions 700 that may be executed to implement the control plane gateway 304 of FIGS. 3 and/or 4, and/or, more generally, the data pipeline service 302 of FIG. 3 to register a data producer. The machine readable instructions 700 of FIG. 7 may be executed to implement block 604 of the machine readable instructions 600 of FIG. 6. The machine readable instructions 700 of FIG. 7 begin at block 702, at which the control plane gateway 304 obtains a request to register a data producer with the data pipeline service 302. For example, the producer registration controller 410 (FIG. 4) can obtain a request from the first data consumer 316 to register the first data producer 320 of FIG. 3 with the data pipeline service 302. In other examples, the producer registration controller 410 can obtain a request from the first data producer 320 to register with the data pipeline service 302. Advantageously, by registering with the data pipeline service 302, the first data producer 320 can facilitate the transfer of data generated by the third public cloud 314 to a private cloud, such as the first private cloud 310 and/or the second private cloud 312 of FIG. 3.

At block 704, the control plane gateway 304 extracts producer registration information from the request. For example, the producer registration controller 410 (FIG. 4) can extract producer registration information including the data producer name "producer-audit-logs-tenant-1" from the request. In such examples, the producer registration controller 410 can store the data producer name in the second column 514 of the producer mapping table 510 of FIG. 5B.

At block 706, the control plane gateway 304 generates a producer registration identifier based on the extracted producer registration information. For example, the producer registration controller 410 can generate the UUID of "ca8e3ff3adcfd275-7f703c5265a63d87." In such examples, the producer registration controller 410 can store the UUID in the first column 512 of the producer mapping table 510 of FIG. 5B.

At block 708, the control plane gateway 304 generates a buffer. For example, the buffer controller 430 (FIG. 4) can instantiate and/or otherwise generate the first buffer 340 of FIG. 3. In such examples, the buffer controller 430 can generate the buffer identifier of "0066a622-b2ac-4898-933-44ee019f1e07" to correspond to the first buffer 340.

At block 710, the control plane gateway 304 stores an association of the producer registration identifier and the buffer. For example, the producer registration controller 410 can store the buffer identifier "0066a622-b2ac-4898-933-44ee019f1e07" in the third column 516 of the producer mapping table 510 of FIG. 5B. In such examples, the producer registration controller 410 can store the association by mapping the producer registration identifier, the data producer name, and the buffer identifier in the same row of the producer mapping table 510.

At block 712, the control plane gateway 304 determines whether the association has been validated. For example, the validation controller 440 (FIG. 4) can determine that the association is valid based on the producer registration identifier, the data producer name, and the buffer identifier conform to storage requirements including data length, data format, etc.

If, at block 712, the control plane gateway 304 determines that the association is validated, control returns to block 606 of the machine readable instructions 600 of FIG. 6 to register a data consumer. If, at block 712, the control plane gateway 304 determines that the association is not validated, then, at block 714, the control plane gateway 304 generates an alert. For example, the validation controller 440 can generate an alert indicative of a failed registration based on the producer registration information extracted from the request. In such examples, the alert can be generated for a user associated with one of the data consumers 316, 318 to execute an action (e.g., re-trigger the registration of the first data producer 320) based on the alert. In other examples, the alert can be generated for one of the data consumers 316, 318 to execute an action in an automated process (e.g., an automatic re-registration of the first data producer 320). In response to generating the alert at block 714, control returns to block 606 of the machine readable instructions 600 of FIG. 6 to register a data consumer.

Figure 8:
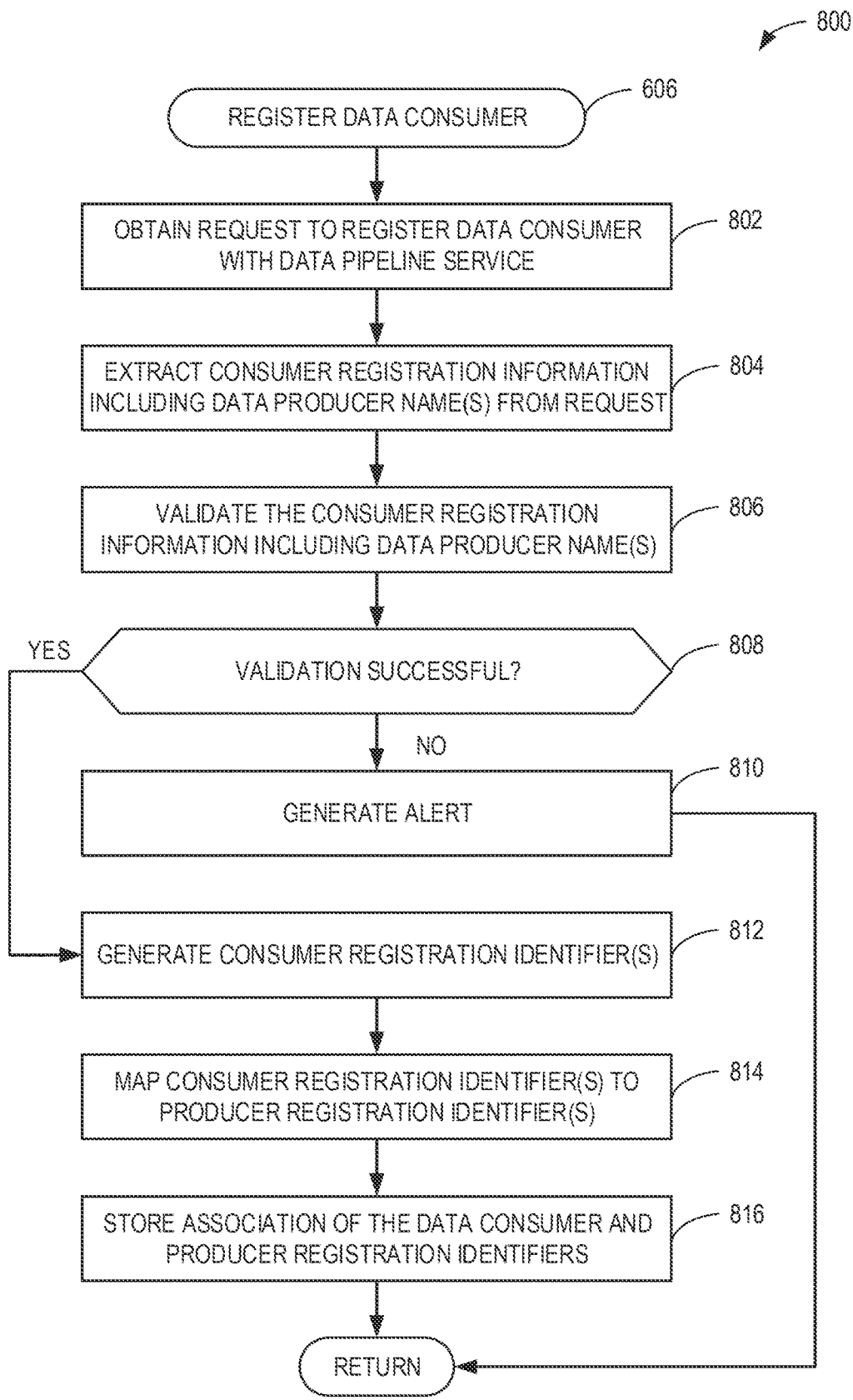
FIG. 8 is a flowchart representative of example machine readable instructions that may be executed to implement the control plane gateway of FIGS. 3 and/or 4, and/or, more generally, the data pipeline service of FIG. 3 to register a data consumer.

FIG. 8 is a flowchart representative of example machine readable instructions 800 that may be executed to implement the control plane gateway 304 of FIGS. 3 and/or 4, and/or, more generally, the data pipeline service 302 of FIG. 3 to register a data consumer. The machine readable instructions 800 of FIG. 8 may be executed to implement block 606 of the machine readable instructions 600 of FIG. 6. The machine readable instructions 800 of FIG. 8 begin at block 802, at which the control plane gateway 304 obtains a request to register a data consumer with the data pipeline service 302. For example, the consumer registration controller 420 (FIG. 4) can obtain a request from the first data consumer 316 to register the first data consumer 316 with the data pipeline service 302. Advantageously, by registering with the data pipeline service 302, the first data consumer 316 can facilitate the transfer of data generated by the third public cloud 314 to a private cloud, such as the first private cloud 310 and/or the second private cloud 312 of FIG. 3.

At block 804, the control plane gateway 304 extracts consumer registration information including data producer name(s) from the request. For example, the consumer registration controller 420 can extract consumer registration information including the data consumer name "consumer-tenant-2" from the request. In such examples, the consumer registration controller 420 can store the data consumer name in the second column 504 of the consumer mapping table 500 of FIG. 5A.

At block 806, the control plane gateway 304 validates the consumer registration information including the data producer name(s). For example, the validation controller 440 (FIG. 4) can reject the request to register the consumer in response to determining that one or more of the data producer names are not stored in the producer mapping table 510 of FIG. 5B and/or otherwise cannot be resolved.

At block 808, the control plane gateway 304 determines whether the validation is successful. If, at block 808, the control plane gateway 304 determines that the validation is not successful, then, at block 810, the control plane gateway 304 generates an alert. For example, the validation controller 440 can generate an alert indicative of a failed registration based on the consumer registration information extracted from the request. In such examples, the alert can be generated for a user associated with one of the data consumers 316, 318 to execute an action (e.g., re-trigger the registration of the first data consumer 316) based on the alert. In other examples, the alert can be generated for one of the data consumers 316, 318 to execute an action in an automated process (e.g., an automatic re-registration of the first data consumer 316). In response to generating the alert at block 810, control returns to block 608 of the machine readable instructions 600 of FIG. 6 to establish a connection between a data producer and the data pipeline service 302 of FIG. 3.

If, at block 808, the control plane gateway 304 determines that the validation is successful, control proceeds to block 812 to generate consumer registration identifier(s). For example, the consumer registration controller 420 can generate the UUID of "3835aaa6-a0ed-460f-86f3-bd92d2752701." In such examples, the consumer registration controller 420 can store the UUID in the first column 502 of the consumer mapping table 500 of FIG. 5A.

At block 814, the control plane gateway 304 maps the consumer registration identifier(s) to producer registration identifier(s). For example, the consumer registration controller 420 can map the consumer registration identifier of "3835aaa6-a0ed-460f-86f3-bd92d2752701" to the producer registration identifier of "0066a622-b2ac-4898-9333-44ee019f1e07."

At block 816, the control plane gateway 304 stores an association of the data consumer and producer registration identifiers. For example, the consumer registration controller 420 can store the association of the consumer registration identifier of "3835aaa6-a0ed-460f-86f3-bd92d2752701" and the producer registration identifier of "0066a622-b2ac-4898-9333-44ee019f1e07" by storing the consumer registration identifier and the producer registration identifier in the same row of the consumer-to-producer mapping table 520 of FIG. 5C. In response to storing the association of the consumer and producer registration identifiers at block 816, control returns to block 608 of the machine readable instructions 600 of FIG. 6 to establish a connection between a data producer and the data pipeline service 302 of FIG. 3.

Figure 9:
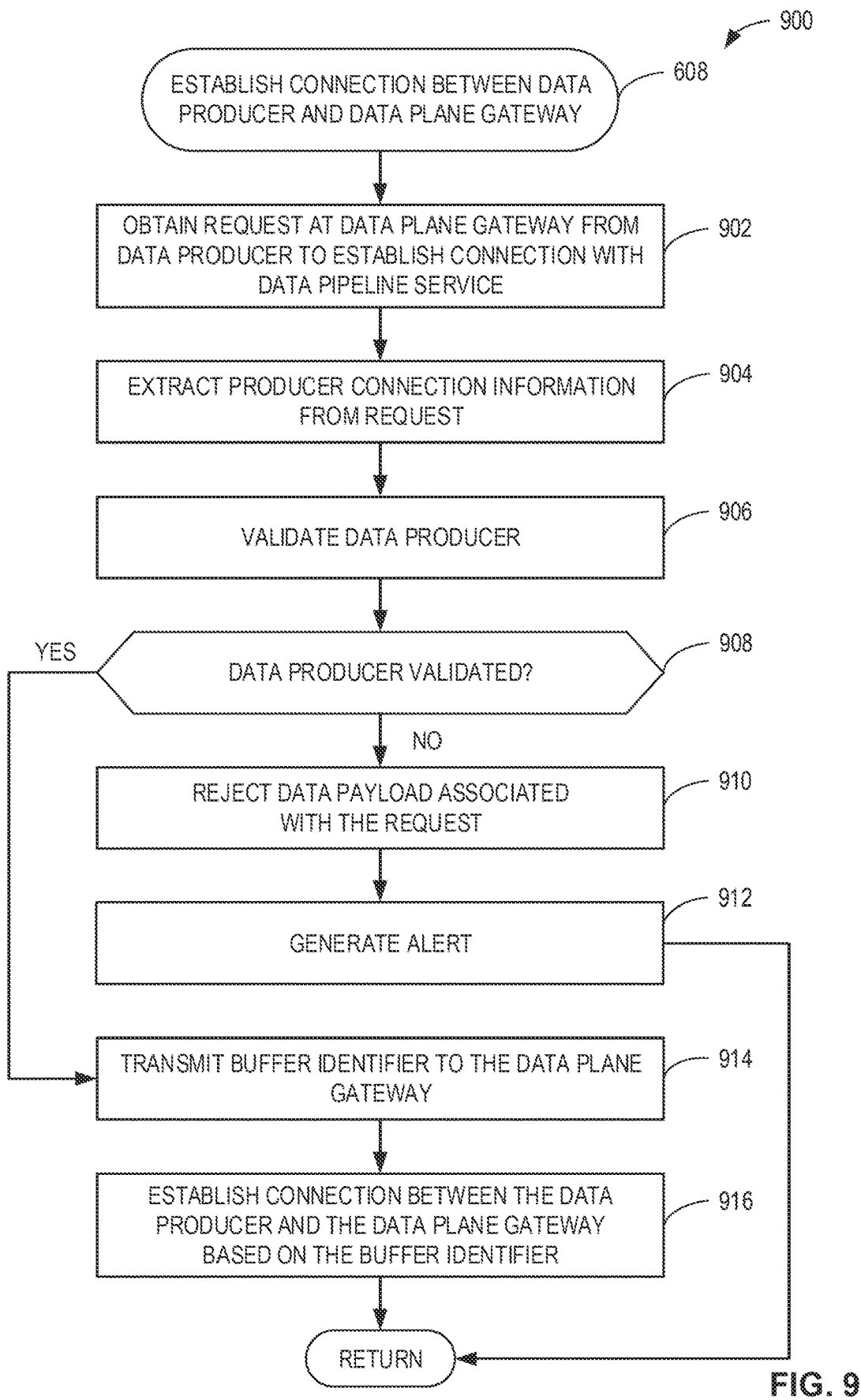
FIG. 9 is a flowchart representative of example machine readable instructions that may be executed to implement the control plane gateway of FIGS. 3 and/or 4, and/or, more generally, the data pipeline service of FIG. 3 to establish a connection between a data producer and a data plane gateway.

FIG. 9 is a flowchart representative of example machine readable instructions 900 that may be executed to implement the control plane gateway 304 of FIGS. 3 and/or 4, and/or, more generally, the data pipeline service 302 of FIG. 3 to establish a connection between a data producer and a data plane gateway. The machine readable instructions 900 of FIG. 9 may be executed to implement block 608 of the machine readable instructions 600 of FIG. 6. The machine readable instructions 900 of FIG. 9 begin at block 902, at which the control plane gateway 304 obtains a request at a data plane gateway from a data producer to establish a connection with the data pipeline service 302. For example, the communication controller 450 (FIG. 4) can determine that the fifth data plane gateway 334 of FIG. 3 has received a request from the first data producer 320. In such examples, the communication controller 450 can determine that the request corresponds to the first data producer 320 requesting to transmit data to the fifth data plane gateway 334.

At block 904, the control plane gateway 304 extracts producer connection information from the request. For example, the communication controller 450 can extract producer connection information including the data producer name "producer-audit-logs-tenant-2" from the request, where the data producer name corresponds to the first data producer 320.

At block 906, the control plane gateway 304 validates the data producer. For example, the validation controller 440 (FIG. 4) can validate the first data producer 320 associated with the request by determining whether the data producer name "producer-audit-logs-tenant-2" is in the producer mapping table 510 of FIG. 5B.

At block 908, the control plane gateway 304 determines whether the data producer is validated. For example, the validation controller 440 can determine that the first data producer 320 is not validated when the data producer name "producer-audit-logs-tenant-2" is not in the producer mapping table 510. In other examples, the validation controller 440 can determine that the first data producer 320 is validated when the data producer name "producer-audit-logs-tenant-2" is included in the producer mapping table 510.

If, at block 908, the control plane gateway 304 determines that the data producer is not validated, then, at block 910, the control plane gateway 304 rejects a data payload associated with the request. For example, the validation controller 440 can instruct the fifth data plane gateway 334 to drop, delete, and/or otherwise discard the data payload included in the request when the first data producer 320 is not validated.

At block 912, the control plane gateway 304 generates an alert. For example, the validation controller 440 can generate an alert indicative of the rejection of the request, the data payload, and/or, more generally, the non-validation of the first data producer 320. In such examples, the validation controller 440 can generate the alert for the first data producer 320 to execute an action in an automated process (e.g., to transmit another request to the fifth data plane gateway 334 to establish a connection).

In response to generating the alert at block 912, control returns to block 610 of the machine readable instructions 600 of FIG. 6 to transmit the data from the data producer to the buffer of the control plane gateway.

If, at block 908, the control plane gateway 304 determines that the data producer is validated, control proceeds to block 914 to transmit a buffer identifier to the data plane gateway. For example, the buffer controller 430 (FIG. 4) can map the data producer name "producer-audit-logs-tenant-2" to the buffer identifier "ce811934-ea1a-4f53-b6ec-465e6ca7d126" in the producer mapping table 510 of FIG. 5B. In such examples, the buffer controller 430 can transmit the buffer identifier "ce811934-ea1a-4f53-b6ec-465e6ca7d126" to the fifth data plane gateway 334.

At block 916, the control plane gateway 304 establishes a connection between the data producer and the data plane gateway based on the buffer identifier. For example, the communication controller 450 can establish a persistent connection between the fifth data plane gateway 334 and the first data producer 320. In such examples, the fifth data plane gateway 334 can transmit data included in the request to one of the buffers 340, 342, 344, 346 corresponding to the buffer identifier "ce811934-ea1a-4f53-b6ec-465e6ca7d126." In such examples, the fifth data plane gateway 334 can stream data included in future or subsequent requests from the first data producer 320 to the one of the buffers 340, 342, 344, 346 having the buffer identifier "ce811934-ea1a-4f53-b6ec-465e6ca7d126." In response to establishing the connection between the data producer and the data pipeline service 302 based on the buffer identifier at block 916, control returns to block 610 of the machine readable instructions 600 of FIG. 6 to transmit the data from the data producer to the buffer of the data pipeline service 302.

Figure 10:
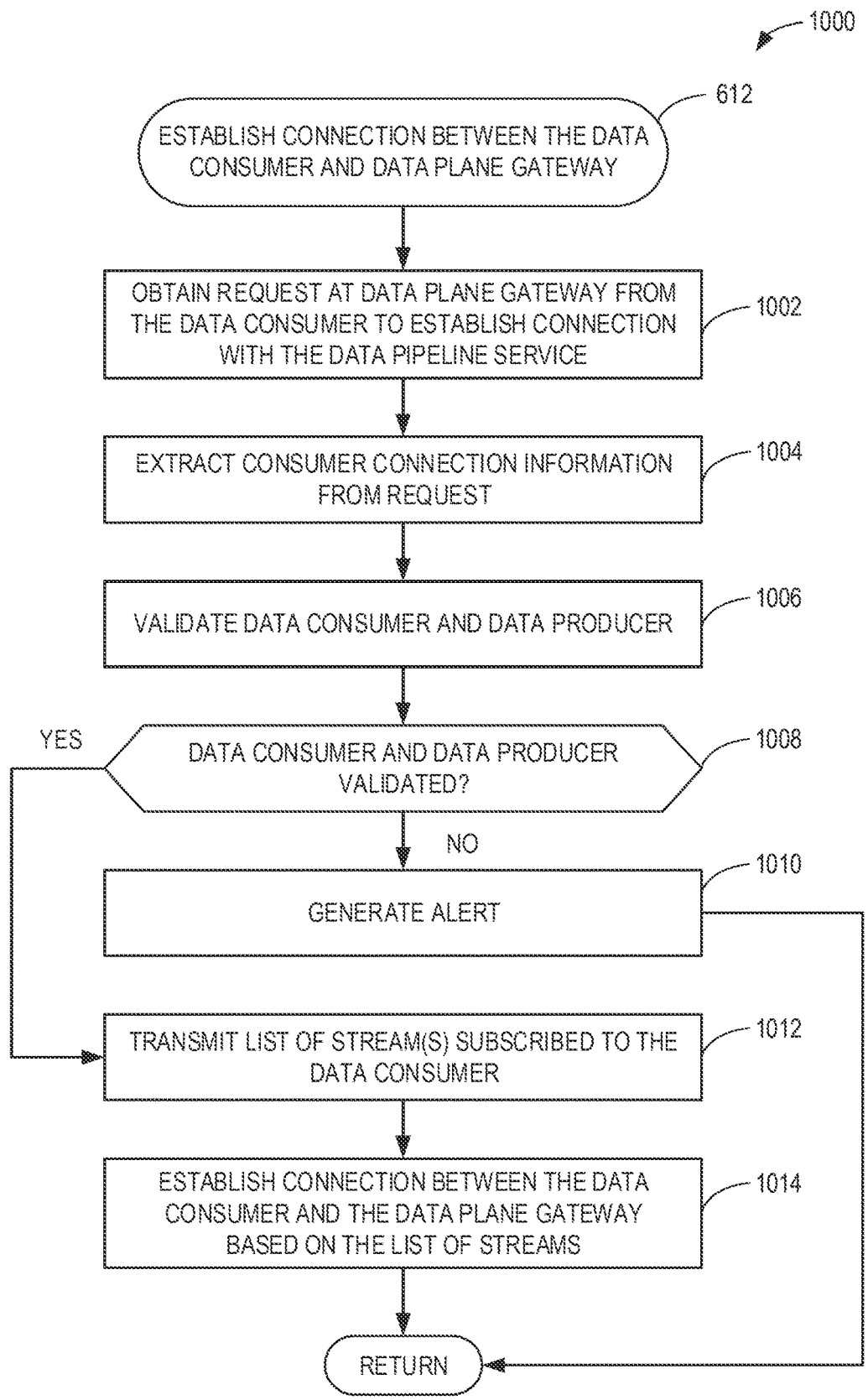
FIG. 10 is a flowchart representative of example machine readable instructions that may be executed to implement the control plane gateway of FIGS. 3 and/or 4, and/or, more generally, the data pipeline service of FIG. 3 to establish a connection between a data consumer and a data plane gateway.

FIG. 10 is a flowchart representative of example machine readable instructions 1000 that may be executed to implement the control plane gateway 304 of FIGS. 3 and/or 4, and/or, more generally, the data pipeline service 302 of FIG. 3 to establish a connection between a data consumer and a data plane gateway. The machine readable instructions 1000 of FIG. 10 may be executed to implement block 612 of the machine readable instructions 600 of FIG. 6. The machine readable instructions 1000 of FIG. 10 begin at block 1002, at which the control plane gateway 304 obtains a request at a data plane gateway from a data consumer to establish a connection with the data pipeline service 302. For example, the communication controller 450 (FIG. 4) can determine that the first data plane gateway 326 of FIG. 3 has received a request from the first data consumer 316. In such examples, the communication controller 450 can determine that the request corresponds to the first data consumer 316 requesting to obtain data from the third public cloud 314 of FIG. 3 via the first data plane gateway 326.

At block 1004, the control plane gateway 304 extracts consumer connection information from the request. For example, the communication controller 450 can extract consumer connection information including the data consumer name "consumer-tenant-2" and/or the data producer name "producer-audit-logs-tenant-2" from the request, where the data consumer name corresponds to the first data consumer 316 and the data producer name corresponds to the first data producer 320.

At block 1006, the control plane gateway 304 validates the data consumer and the data producer. For example, the validation controller 440 (FIG. 4) can validate the first data consumer 316 associated with the request by determining whether the data consumer name "consumer-tenant-2" is in the consumer mapping table 500 of FIG. 5A. The validation controller 440 can validate the first data producer 320 by determining whether the data producer name "producer-audit-logs-tenant-2" is in the producer mapping table 510 of FIG. 5B.

At block 1008, the control plane gateway 304 determines whether the data consumer and the data producer are validated. For example, the validation controller 440 can determine that the first data consumer 316 is not validated when the data consumer name "consumer-tenant-2" is not in the consumer mapping table 500, the first data producer 320 is not validated when the data producer name "producer-audit-logs-tenant-2" is not in the producer mapping table 510, etc. In other examples, the validation controller 440 can determine that the first data consumer 316 is validated when the data consumer name "consumer-tenant-2" is included in the consumer mapping table 500, the first data producer 320 is validated when the data producer name "producer-audit-logs-tenant-2" is included in the producer mapping table 510, etc.

If, at block 1008, the control plane gateway 304 determines that the data consumer and the data producer are not validated, then, at block 1010, the control plane gateway 304 generates an alert indicative of rejecting the request. For example, the validation controller 440 can instruct the first data plane gateway 326 to drop, delete, and/or otherwise remove the request when the first data consumer 316 and/or the first data producer 320 are not validated. In such examples, the validation controller 440 can generate an alert for a user associated with the first data consumer 316 and/or for an automated process to be executed by the first data consumer 316, where the alert can be indicative of the rejection of the request, and/or, more generally, the non-validation of the first data consumer 316 and/or the first data producer 320. In response to generating the alert at block 1010, control returns to block 614 of the machine readable instructions 600 of FIG. 6 to stream the data from the buffer to the data consumer.

If, at block 1008, the control plane gateway 304 validates the data consumer and the data producer, control proceeds to block 1012 to transmit a list of stream(s) subscribed to the data consumer. For example, the communication controller 450 can instruct the first data plane gateway 326 to provide one or more data streams to the first data consumer 316. In such examples, the one or more data streams can include a data stream associated with the producer registration identifier "0066a622-b2ac-4898-9333-44ee019f1e07" based on the consumer-to-producer mapping table 520 of FIG. 5C.

At block 1014, the control plane gateway 304 establishes a connection between the data consumer and the data plane gateway based on the list of streams. For example, the communication controller 450 can establish a persistent connection between the first data plane gateway 326 and the first data consumer 316 to stream data produced by one of the data producers 320, 322, 324 corresponding to the producer registration identifier "0066a622-b2ac-4898-9333-44ee019f1e07" based on the consumer-to-producer mapping table 520 of FIG. 5C. In response to establishing the connection between the data consumer and the data pipeline service 302 based on the list of streams at block 1014, control returns to block 614 of the machine readable instructions 600 of FIG. 6 to transmit the data from the buffer to the data consumer.

Figure 11:
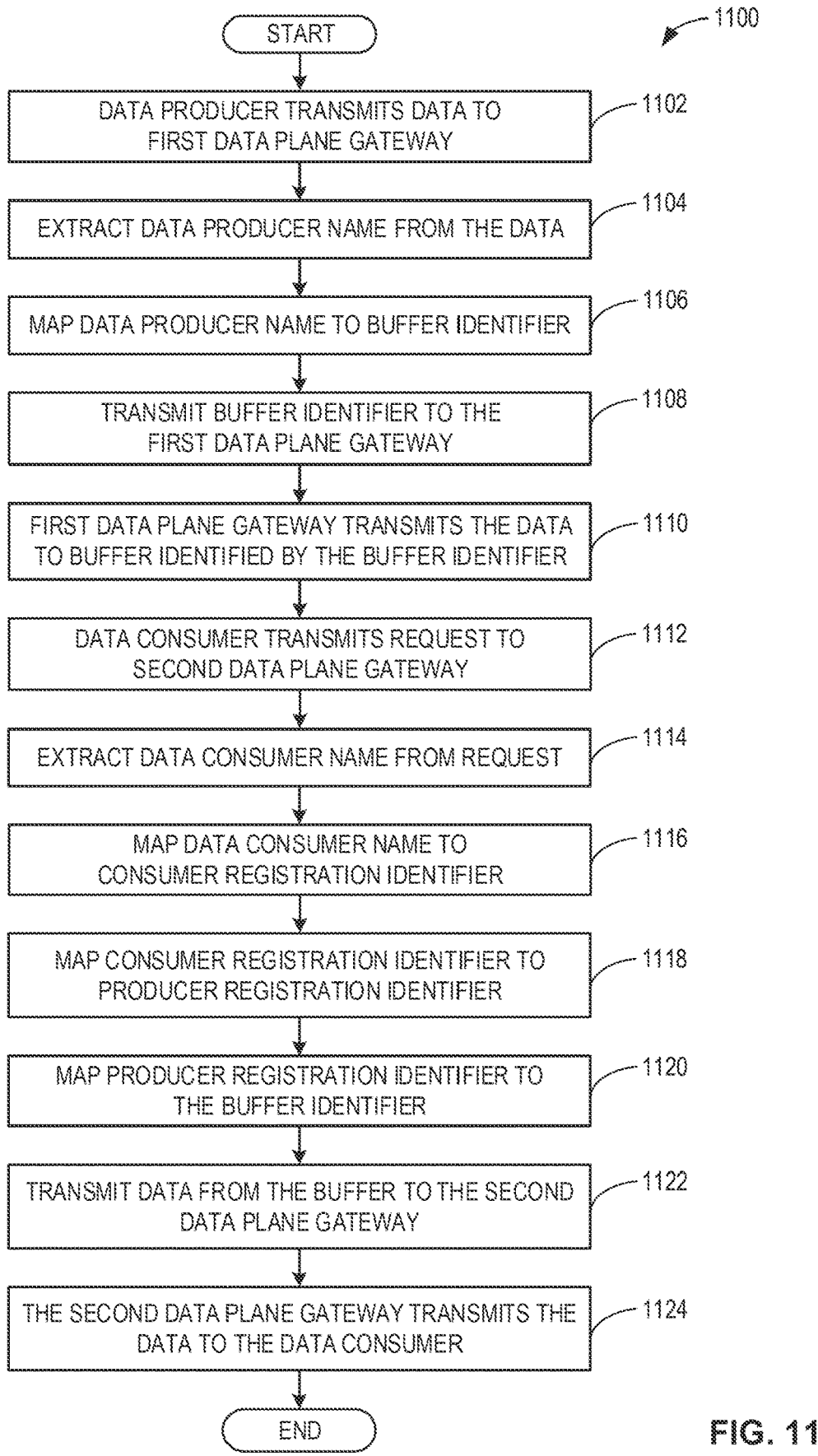
FIG. 11 is a flowchart representative of example machine readable instructions that may be executed to implement the control plane gateway of FIGS. 3 and/or 4, and/or, more generally, the data pipeline service of FIG. 3 to transmit data generated by the example public cloud of FIG. 3 to the example private cloud of FIG. 3.

FIG. 11 is a flowchart representative of example machine readable instructions 1100 that may be executed to implement the control plane gateway 304 of FIGS. 3 and/or 4, and/or, more generally, the data pipeline service 302 of FIG. 3 to transmit data generated by the third public cloud 314 of FIG. 3 to one or more of the private clouds 310, 312 of FIG. 3. The machine readable instructions 1100 of FIG. 11 begin at block 1102, at which a data producer transmits data to a first data plane gateway. For example, the third data producer 324 of FIG. 3 can transmit data to the sixth data plane gateway 336 of FIG. 3.

At block 1104, the control plane gateway 304 extracts a producer name from the data. For example, the communication controller 450 (FIG. 4) can extract the data producer name "producer-metrics-tenant-1" from the data.

At block 1106, the control plane gateway 304 maps the data producer name to a buffer identifier. For example, the buffer controller 430 (FIG. 4) can map the data producer name "producer-metrics-tenant-1" to the buffer identifier "0066a622-b2ac-4898-933-44ee019f1e07" in the producer mapping table 510 of FIG. 5B.

At block 1108, the control plane gateway 304 transmits the buffer identifier to the first data plane gateway. For example, the buffer controller 430 can transmit the buffer identifier "0066a622-b2ac-4898-933-44ee019f1e07" to the sixth data plane gateway 336.

At block 1110, the first data plane gateway transmits the data to a buffer identified by the buffer identifier. For example, the buffer identifier "0066a622-b2ac-4898-933-44ee019f1e07" can identify the first buffer 340 of FIG. 3. In such examples, the sixth data plane gateway 336 can transmit the data from the third data producer 324 to the first buffer 340 based on the buffer identifier.

At block 1112, a data consumer transmits a request to a second data plane gateway. For example, the second data consumer 318 of FIG. 3 can transmit a request to obtain data originating within the third public cloud 314 of FIG. 3 to the second data plane gateway 328 of FIG. 3.

At block 1114, the control plane gateway 304 extracts a data consumer name from the request. For example, the communication controller 450 can extract the data consumer name "consumer-tenant-1" from the request.

At block 1116, the control plane gateway 304 maps the data consumer name to a consumer registration identifier. For example, the communication controller 450 can map the data consumer name "consumer-tenant-1" to the consumer registration identifier "0066a622-b2ac-4898-9333-44ee019f1e07" based on the mapping in the consumer mapping table 500 of FIG. 5A.

At block 1118, the control plane gateway 304 maps a consumer registration identifier to a producer registration identifier. For example, the communication controller 450 can map the consumer registration identifier "0066a622-b2ac-4898-9333-44ee019f1e07" to the producer registration identifier "003b15c9-9a96-460e-8924-ae7458afec02" in response to a selection by the second data consumer 318 based on a list of streams provided to the second data consumer 318. For example, in the consumer-to-producer mapping table 520 of FIG. 5C, the consumer registration identifier "0066a622-b2ac-4898-9333-44ee019f1e07" is mapped to two different data producers. In such examples, the communication controller 450 can provide a list of streams to the second data consumer 318 that the second data consumer 318 is subscribed to, where the list of streams includes a first stream corresponding to data produced by the producer registration identifier "003b15c9-9a96-460e-8924-ae7458afec02" and a second stream corresponding to data produced by the producer registration identifier "ca8e3ff3adcfd275-7f703c5265a63d87." In response to obtaining the list of streams, the second data consumer 318 can select the first data stream, the second data stream, etc., and/or a combination thereof.

At block 1120, the control plane gateway 304 maps the producer registration identifier to the buffer identifier. For example, the buffer controller 430 can map the producer registration identifier "003b15c9-9a96-460e-8924-ae7458afec02" to the buffer identifier "0066a622-b2ac-4898-933-44ee019f1e07" based on the producer mapping table 510 of FIG. 5B.

At block 1122, the control plane gateway 304 transmits the data from the buffer to the second data plane gateway. For example, the buffer controller 430 can transmit the data stored in the first buffer 340 to the second data plane gateway 328.

At block 1124, the second data plane gateway transmits the data to the data consumer. For example, the second data plane gateway 328 can transmit the data to the second data consumer 318 via the second data pipeline 308 to facilitate the transfer of data originating within and/or otherwise generated by the third public cloud 314 to the second private cloud 312.

Figure 12:
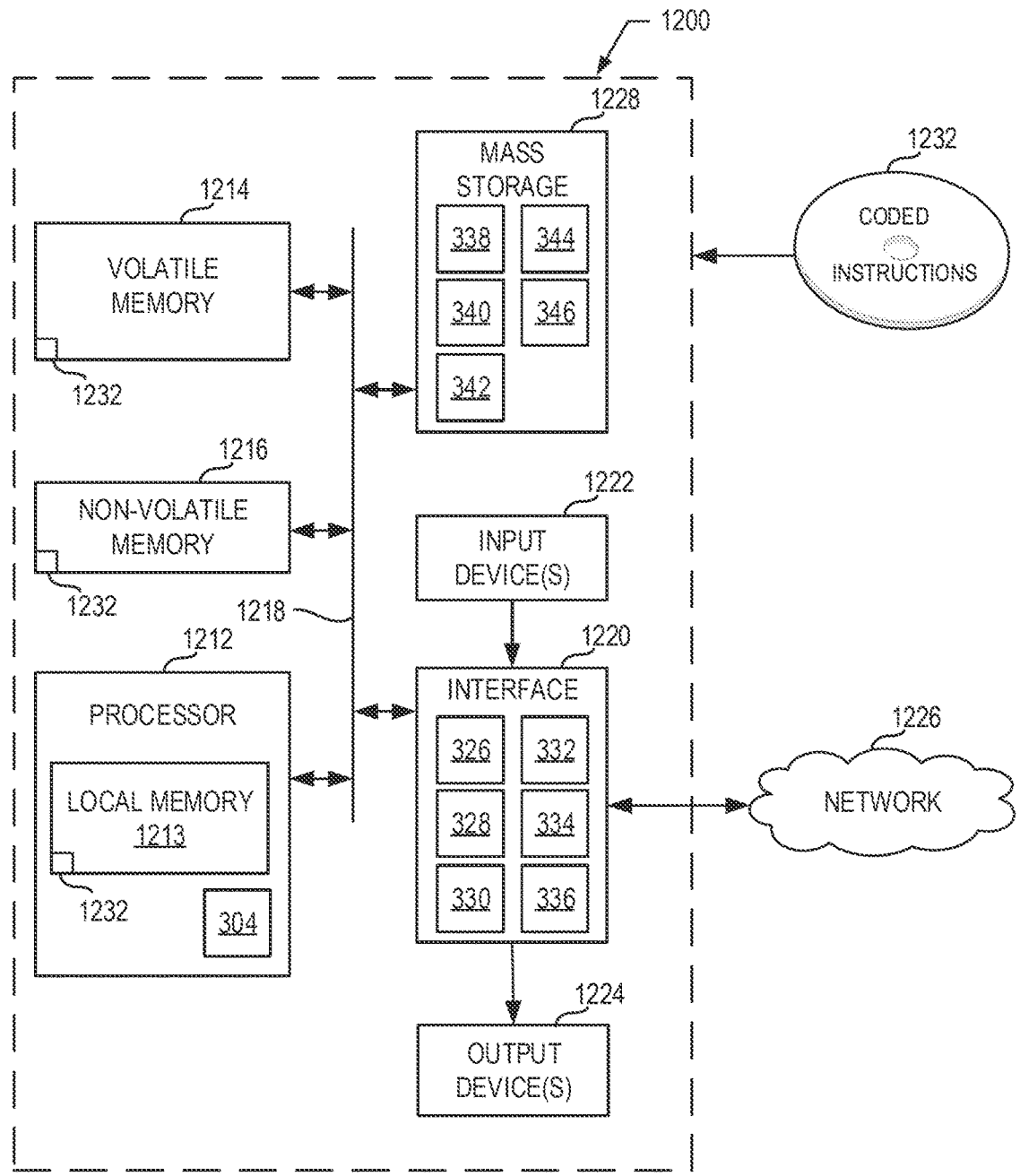
FIG. 12 is a block diagram of an example processing platform structured to execute the example machine readable instructions of FIGS. 6-11 to implement the data pipeline service of FIG. 3.

FIG. 12 is a block diagram of an example processor platform 1200 structured to execute the instructions of FIGS. 6-11 to implement the example data pipeline service 302 of FIG. 3. The processor platform 1200 can be, for example, a server, a personal computer, a workstation, a self-learning machine (e.g., a neural network), or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1212 implements the example control plane gateway 304 of FIG. 3.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface. In this example, the interface circuit 1220 implements the first through sixth data plane gateways 326, 328, 330, 332, 334, 336 of FIG. 3.

In the illustrated example, one or more input devices 1222 are connected to the interface circuit 1220. The input device(s) 1222 permit(s) a user to enter data and/or commands into the processor 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and DVD drives. In this example, the one or more mass storage devices 1228 implement the example configuration database 338, the first example buffer 340, the second example buffer 342, the third example buffer 344, and the fourth example buffer 346 of FIG. 3.

The machine executable instructions 1232 of FIGS. 6-11 may be stored in the mass storage device 1228, in the volatile memory 1214, in the non-volatile memory 1216, and/or on a removable non-transitory computer readable storage medium such as a CD or DVD.

Figure 13:
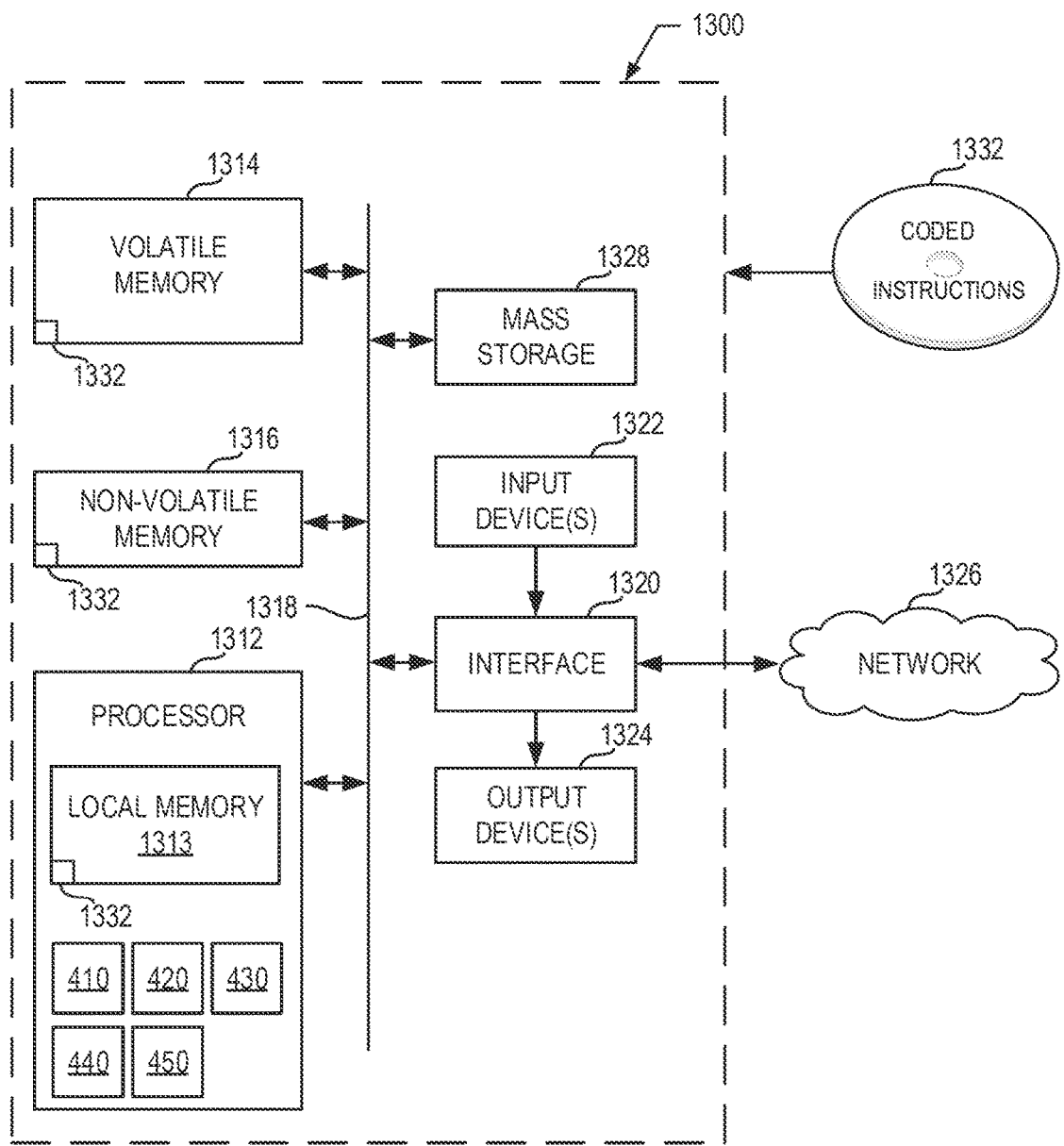
FIG. 13 is a block diagram of an example processing platform structured to execute the example machine readable instructions of FIGS. 6-11 to implement the control plane gateway of FIGS. 3 and/or 4.

FIG. 13 is a block diagram of an example processor platform 1300 structured to execute the instructions of FIGS. 6-11 to implement the example control plane gateway 304 of FIGS. 3-4. The processor platform 1300 can be, for example, a server, a personal computer, a workstation, a self-learning machine (e.g., a neural network), or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1312 implements the example producer registration controller 410, the example consumer registration controller 420, the example buffer controller 430, the example validation controller 440, and the example communication controller 450.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a USB, a Bluetooth® interface, a NFC interface, and/or a PCI express interface.

In the illustrated example, one or more input devices 1322 are connected to the interface circuit 1320. The input device(s) 1322 permit(s) a user to enter data and/or commands into the processor 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuit 1320 of the illustrated example. The output devices 1324 can be implemented, for example, by display devices (e.g., a LED, an OLED, a LCD, a CRT display, an IPS display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a DSL connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and DVD drives.

The machine executable instructions 1332 of FIGS. 6-11 may be stored in the mass storage device 1328, in the volatile memory 1314, in the non-volatile memory 1316, and/or on a removable non-transitory computer readable storage medium such as a CD or DVD.

From the foregoing, it will be appreciated that example methods, apparatus, and articles of manufacture have been disclosed that establish data pipelines between cloud computing platforms. Advantageously, by creating persistent connections between data consumers and the example control plane gateway as disclosed herein, the example methods, apparatus, and articles of manufacture can maintain connections longer to facilitate the streaming of large amounts of data through a single connection establishment. The disclosed methods, apparatus, and articles of manufacture transfer data originating from a public cloud to a private cloud. Accordingly, the disclosed methods, apparatus and articles of manufacture improve the efficiency of using a computing device by generating outputs in a private cloud where the outputs are based on data previously only accessible from within a public cloud. The disclosed methods, apparatus and articles of manufacture are accordingly directed to one or more improvement(s) in the functioning of a computer.

Example methods, apparatus, systems, and articles of manufacture for data pipelines between cloud computing platforms are disclosed herein. Further examples and combinations thereof include the following:

Example 1 includes an apparatus to establish a data pipeline in a virtual computing environment, the apparatus comprising a producer registration controller to register a data producer with a data pipeline service in a public cloud network, the data producer associated with a private cloud network, a consumer registration controller to register a data consumer with the data pipeline service, and a communication controller to in response to the registration of the data consumer, transmit data generated by the public cloud network from the data consumer to a data buffer via a first data plane gateway, and in response to a validation of the data consumer, transmit the data from the data buffer to the data consumer via a second data plane gateway, the first data plane gateway different from the second data plane gateway.

Example 2 includes the apparatus of example 1, wherein the producer registration controller is to extract a first name of the data producer from a request from the data producer to the data pipeline service, the request to register the data producer, generate a data producer identifier based on the first name, invoke a buffer controller to generate a data buffer by generating a data buffer identifier, and store an association of the first name, the data producer identifier, and the data buffer identifier in a database.

Example 3 includes the apparatus of example 1, wherein the consumer registration controller is to extract a first name of the data producer and a second name of the data consumer from a request from the data consumer to the data pipeline service, the request to register the data consumer, in response to a validation of the first name, generate a data consumer identifier based on the second name, store a first association of the second name and the data consumer identifier, map the data consumer identifier to a data producer identifier associated with the first name based on the first association, and store a second association of the data consumer identifier and the data producer identifier in a database.

Example 4 includes the apparatus of example 1, wherein the communication controller is to extract a first name of the data producer and the data from a request from the data producer to the first data plane gateway, the request to transmit data to the private cloud network, and further including a validation controller to validate the data producer by mapping the first name to a data producer identifier in a database, in response to the validation of the data producer, a buffer controller to determine a data buffer identifier by mapping the data producer identifier to the data buffer identifier in the database, the data buffer identifier identifying a data buffer, and in response to transmitting the data buffer identifier to the first data plane gateway, the communication controller is to invoke the first data plane gateway to transmit the data from the first data plane gateway to the data buffer.

Example 5 includes the apparatus of example 1, wherein the communication controller is to extract a second name of the data consumer from a request from the data consumer to the second data plane gateway, the request to obtain the data from the public cloud network, and further including a validation controller to validate the data consumer by mapping the second name to a data consumer identifier in a database, in response to validating the data consumer, a buffer controller to determine a data buffer identifier by mapping the data consumer identifier to the data buffer identifier in the database, the data buffer identifier identifying a data buffer, and the communication controller is to transmit the data from the data buffer to the data consumer via the second data plane gateway.

Example 6 includes the apparatus of example 5, wherein the data buffer identifier is a first data buffer identifier, and the communication controller is to transmit a list of data streams subscribed to by the data consumer, the list of data streams including a first data stream associated with a first data buffer identified by the first data buffer identifier and a second data stream associated with a second data buffer identified by a second data buffer identifier, and transmit at least one of the first data stream or the second data stream to the data consumer.

Example 7 includes the apparatus of example 1, wherein the second data plane gateway is exposed to the private cloud network, and the first data plane gateway and the data producer are not exposed to the private cloud network.

Example 8 includes a non-transitory computer readable storage medium comprising instructions that, when executed, cause at least one processor to at least register a data producer with a data pipeline service in a public cloud network, the data producer associated with a private cloud network, register a data consumer with the data pipeline service, in response to registering the data consumer, transmit data generated by the public cloud network from the data consumer to a data buffer via a first data plane gateway, and in response to validating the data consumer, transmit the data from the data buffer to the data consumer via a second data plane gateway, the first data plane gateway different from the second data plane gateway.

Example 9 includes the non-transitory computer readable storage medium of example 8, wherein the instructions, when executed, cause the at least one processor to extract a first name of the data producer from a request from the data producer to the data pipeline service, the request to register the data producer, generate a data producer identifier based on the first name, generate a data buffer by generating a data buffer identifier, and store an association of the data producer identifier and the data buffer identifier in a database.

Example 10 includes the non-transitory computer readable storage medium of example 8, wherein the instructions, when executed, cause the at least one processor to extract a first name of the data producer and a second name of the data consumer from a request from the data consumer to the data pipeline service, the request to register the data consumer, in response to a validation of the first name, generate a data consumer identifier based on the second name, store a first association of the second name and the data consumer identifier, map the data consumer identifier to a data producer identifier associated with the first name based on the first association, and store a second association of the data consumer identifier and the data producer identifier in a database.

Example 11 includes the non-transitory computer readable storage medium of example 8, wherein the instructions, when executed, cause the at least one processor to extract a first name of the data producer and the data from a request from the data producer to the first data plane gateway, the request to transmit data to the private cloud network, validate the data producer by mapping the first name to a data producer identifier in a database, in response to validating the data producer, determine a data buffer identifier by mapping the data producer identifier to the data buffer identifier in the database, the data buffer identifier identifying a data buffer, and in response to transmitting the data buffer identifier to the first data plane gateway, transmit the data from the first data plane gateway to the data buffer.

Example 12 includes the non-transitory computer readable storage medium of example 8, wherein the instructions, when executed, cause the at least one processor to extract a second name of the data consumer from a request from the data consumer to the second data plane gateway, the request to obtain the data from the public cloud network, validate the data consumer by mapping the second name to a data consumer identifier in a database, in response to validating the data consumer, determine a data buffer identifier by mapping the data consumer identifier to the data buffer identifier in the database, the data buffer identifier identifying a data buffer, and transmit the data from the data buffer to the data consumer via the second data plane gateway.

Example 13 includes the non-transitory computer readable storage medium of example 12, wherein the data buffer identifier is a first data buffer identifier, and the instructions, when executed, cause the at least one processor to transmit a list of data streams subscribed to by the data consumer, the list of data streams including a first data stream associated with a first data buffer identified by the first data buffer identifier and a second data stream associated with a second data buffer identified by a second data buffer identifier, and transmit at least one of the first data stream or the second data stream to the data consumer.

Example 14 includes the non-transitory computer readable storage medium of example 8, wherein the second data plane gateway is exposed to the private cloud network, and the first data plane gateway and the data producer are not exposed to the private cloud network.

Example 15 includes a method to establish a data pipeline in a virtual computing environment, the method comprising registering a data producer with a data pipeline service in a public cloud network, the data producer associated with a private cloud network, registering a data consumer with the data pipeline service, in response to registering the data consumer, transmitting data generated by the public cloud network from the data consumer to a data buffer via a first data plane gateway, and in response to validating the data consumer, transmitting the data from the data buffer to the data consumer via a second data plane gateway, the first data plane gateway different from the second data plane gateway.

Example 16 includes the method of example 15, further including extracting a first name of the data producer from a request from the data producer to the data pipeline service, the request to register the data producer, generating a data producer identifier based on the first name, generating a data buffer by generating a data buffer identifier, and storing an association of the data producer identifier and the data buffer identifier in a database.

Example 17 includes the method of example 15, further including extracting a first name of the data producer and a second name of the data consumer from a request from the data consumer to the data pipeline service, the request to register the data consumer, in response to a validation of the first name, generating a data consumer identifier based on the second name, storing a first association of the second name and the data consumer identifier, mapping the data consumer identifier to a data producer identifier associated with the first name based on the first association, and storing a second association of the data consumer identifier and the data producer identifier in a database.

Example 18 includes the method of example 15, further including extracting a first name of the data producer and the data from a request from the data producer to the first data plane gateway, the request to transmit data to the private cloud network, validating the data producer by mapping the first name to a data producer identifier in a database, in response to validating the data producer, determining a data buffer identifier by mapping the data producer identifier to the data buffer identifier in the database, the data buffer identifier identifying a data buffer, and in response to transmitting the data buffer identifier to the first data plane gateway, transmitting the data from the first data plane gateway to the data buffer.

Example 19 includes the method of example 15, further including extracting a second name of the data consumer from a request from the data consumer to the second data plane gateway, the request to obtain the data from the public cloud network, validating the data consumer by mapping the second name to a data consumer identifier in a database, in response to validating the data consumer, determining a data buffer identifier by mapping the data consumer identifier to the data buffer identifier in the database, the data buffer identifier identifying a data buffer, and transmitting the data from the data buffer to the data consumer via the second data plane gateway.

Example 20 includes the method of example 19, wherein the data buffer identifier is a first data buffer identifier, and further including transmitting a list of data streams subscribed to by the data consumer, the list of data streams including a first data stream associated with a first data buffer identified by the first data buffer identifier and a second data stream associated with a second data buffer identified by a second data buffer identifier, and transmitting at least one of the first data stream or the second data stream to the data consumer.

Example 21 includes the method of example 15, wherein the second data plane gateway is exposed to the private cloud network, and the first data plane gateway and the data producer are not exposed to the private cloud network.

Example 22 includes an apparatus to establish a data pipeline in a virtual computing environment, the apparatus comprising first means for registering a data producer with a data pipeline service in a public cloud network, the data producer associated with a private cloud network, second means for registering a data consumer with the data pipeline service, and means for transmitting to in response to the registration of the data consumer, transmit data generated by the public cloud network from the data consumer to a data buffer via a first data plane gateway, and in response to a validation of the data consumer, transmit the data from the data buffer to the data consumer via a second data plane gateway, the first data plane gateway different from the second data plane gateway.

Example 23 includes the apparatus of example 22, wherein the first means for registering is to extract a first name of the data producer and a second name of the data consumer from a request from the data consumer to the data pipeline service, the request to register the data consumer, in response to a validation of the first name, generate a data consumer identifier based on the second name, store a first association of the second name and the data consumer identifier, map the data consumer identifier to a data producer identifier associated with the first name based on the first association, and store a second association of the data consumer identifier and the data producer identifier in a database.

Example 24 includes the apparatus of example 22, wherein the second means for registering is to extract a first name of the data producer and a second name of the data consumer from a request from the data consumer to the data pipeline service, the request to register the data consumer, in response to a validation of the first name, generate a data consumer identifier based on the second name, map the data consumer identifier to a data producer identifier associated with the first name, and store an association of the data consumer identifier and the data producer identifier in a database.

Example 25 includes the apparatus of example 22, further including means for extracting a first name of the data producer and the data from a request from the data producer to the first data plane gateway, the request to transmit data to the private cloud network, means for validating the data producer by mapping the first name to a data producer identifier in a database, in response to the validation of the data producer, means for determining a data buffer identifier by mapping the data producer identifier to the data buffer identifier in the database, the data buffer identifier identifying a data buffer, and in response to transmitting the data buffer identifier to the first data plane gateway, the means for transmitting is to invoke the first data plane gateway to transmit the data from the first data plane gateway to the data buffer.

Example 26 includes the apparatus of example 22, further including means for extracting a second name of the data consumer from a request from the data consumer to the second data plane gateway, the request to obtain the data from the public cloud network, means for validating the data consumer by mapping the second name to a data consumer identifier in a database, in response to validating the data consumer, means for determining a data buffer identifier by mapping the data consumer identifier to the data buffer identifier in the database, the data buffer identifier identifying a data buffer, and the means for transmitting is to transmit the data from the data buffer to the data consumer via the second data plane gateway.

Example 27 includes the apparatus of example 26, wherein the data buffer identifier is a first data buffer identifier, and wherein the means for transmitting is to transmit a list of data streams subscribed to by the data consumer, the list of data streams including a first data stream associated with a first data buffer identified by the first data buffer identifier and a second data stream associated with a second data buffer identified by a second data buffer identifier, and transmit at least one of the first data stream or the second data stream to the data consumer.

Example 28 includes the apparatus of example 22, wherein the second data plane gateway is exposed to the private cloud network, and the first data plane gateway and the data producer are not exposed to the private cloud network.

Although certain example systems, methods, apparatus and articles of manufacture have been disclosed herein, the scope of coverage of this patent is not limited thereto. On the contrary, this patent covers all systems, methods, apparatus and articles of manufacture fairly falling within the scope of the claims of this patent.

What is claimed is:

1. An apparatus comprising:
   at least one memory;
   machine readable instructions in the apparatus; and
   programmable circuitry to execute the machine readable instructions to at least:
   extract a data producer name from data, the data to be provided from a data producer to a data consumer;
   identify a buffer identifier based on a mapping of the data producer name to the buffer identifier;
   cause transmission of the data to a buffer associated with the buffer identifier; and
   cause transmission of the data from the buffer to the data consumer based on an association between the buffer identifier and a data consumer name, the data consumer name corresponding to the data consumer.

2. The apparatus of claim 1, wherein the data producer is associated with a public cloud network, the data producer is one of a physical server rack, a virtual server rack, a software application, or a network interface, and the programmable circuitry is to obtain the data from the one of the physical server rack, the virtual server rack, the software application, or the network interface.

3. The apparatus of claim 1, wherein the data consumer is associated with a private cloud network, the data consumer is one of a physical server rack, a virtual server rack, a software application, or a network interface, and the programmable circuitry is to obtain a request for the data from the one of the physical server rack, the virtual server rack, the software application, or the network interface.

4. The apparatus of claim 1, wherein the programmable circuitry is to:
   cause transmission of the data from the data producer to a data plane gateway; and
   cause transmission of the data from the data plane gateway to the buffer.

5. The apparatus of claim 1, wherein the mapping is a first mapping, and the programmable circuitry is to:
   extract the data consumer name from a request for the data by the data consumer, the request to be received at a data plane gateway;
   identify a consumer registration identifier based on a second mapping of the data consumer name to the consumer registration identifier;
   identify a producer registration identifier based on a third mapping of the consumer registration identifier to the producer registration identifier; and
   identify the buffer identifier based on a fourth mapping of the producer registration identifier to the buffer identifier.

6. The apparatus of claim 5, wherein the programmable circuitry is to:
   cause transmission of the data from the buffer to the data plane gateway; and
   cause transmission of the data plane gateway to the data consumer.

7. The apparatus of claim 1, wherein the programmable circuitry is to:
   obtain a request to register the data producer with a data pipeline service;
   generate a producer registration identifier based on data in the request;
   instantiate the buffer with the buffer identifier; and
   store an association of the producer registration identifier and the buffer identifier.

8. The apparatus of claim 1, wherein the programmable circuitry is to:
   obtain a request to register the data consumer with a data pipeline service;
   generate a consumer registration identifier based on data in the request; and
   store an association of the consumer registration identifier and a producer registration identifier, the producer registration identifier associated with the data producer.

9. At least one non-transitory machine readable medium comprising instructions to cause programmable circuitry to at least:
   locate a buffer identifier based on a mapping of the buffer identifier to a data producer name, the data producer name from data to be provided from a data producer to a data consumer;
   cause transmission of the data to a buffer associated with the buffer identifier; and
   cause transmission of the data from the buffer to the data consumer based on an association of: (1) a data consumer name of the data consumer, and (2) the buffer identifier.

10. The at least one non-transitory machine readable medium of claim 9, wherein the instructions are to cause the programmable circuitry to:

cause transmission of the data from the data producer to a data plane gateway; and cause transmission of the data from the data plane gateway to the buffer.

11. The at least one non-transitory machine readable medium of claim 9, wherein the mapping is a first mapping, and the instructions are to cause the programmable circuitry to:

obtain the data consumer name from a request for the data by the data consumer, the request to be received at a data plane gateway;

locate a consumer registration identifier based on a second mapping of the data consumer name to the consumer registration identifier;

locate a producer registration identifier based on a third mapping of the consumer registration identifier to the producer registration identifier; and locate the buffer identifier based on a fourth mapping of the producer registration identifier to the buffer identifier.

12. The at least one non-transitory machine readable medium of claim 11, wherein the instructions are to cause the programmable circuitry to:

cause transmission of the data from the buffer to the data plane gateway; and cause transmission of the data plane gateway to the data consumer.

13. The at least one non-transitory machine readable medium of claim 9, wherein the instructions are to cause the programmable circuitry to:

create a producer registration identifier based on a request to register the data producer with a data pipeline service;

create the buffer with the buffer identifier; and store an association of the producer registration identifier and the buffer identifier.

14. The at least one non-transitory machine readable medium of claim 9, wherein the instructions are to cause the programmable circuitry to:

establish a consumer registration identifier based on a request to register the data consumer with a data pipeline service; and store an association of the consumer registration identifier and a producer registration identifier, the producer registration identifier associated with the data producer.

15. A method comprising:

identifying a buffer identifier based on a mapping of the buffer identifier to a data producer name from data to be provided from a data producer to a data consumer;

causing transmission of the data to a buffer associated with the buffer identifier; and causing transmission of the data from the buffer to the data consumer based on an association between: (a) a data consumer name of the data consumer, and (b) the buffer identifier.

16. The method of claim 15, further including:

transmitting the data from the data producer to a data plane gateway; and transmitting the data from the data plane gateway to the buffer.

17. The method of claim 15, wherein the mapping is a first mapping, and the method further including:

obtaining the data consumer name from a request for the data by the data consumer, the request to be received at a data plane gateway;

discovering a consumer registration identifier based on a second mapping of the data consumer name to the consumer registration identifier;

discovering a producer registration identifier based on a third mapping of the consumer registration identifier to the producer registration identifier; and discovering the buffer identifier based on a fourth mapping of the producer registration identifier to the buffer identifier.

18. The method of claim 17, further including:

transmitting the data from the buffer to the data plane gateway; and transmitting the data plane gateway to the data consumer.

19. The method of claim 15, further including:

obtaining a request to register the data producer with a data pipeline service;

generating a producer registration identifier based on data included in the request;

establishing the buffer, the buffer to be associated with the buffer identifier; and recording an association of the producer registration identifier and the buffer identifier.

20. The method of claim 15, further including:

establishing a consumer registration identifier based on a request to register the data consumer with a data pipeline service; and recording an association of the consumer registration identifier and a producer registration identifier, the producer registration identifier associated with the data producer.

* * * * *